(12) United States Patent
Shih et al.

(10) Patent No.: US 11,589,276 B2
(45) Date of Patent: Feb. 21, 2023

(54) METHOD AND USER EQUIPMENT FOR CELL (RE)SELECTION

(71) Applicant: FG Innovation Company Limited, Tuen Mun (HK)

(72) Inventors: Mei-Ju Shih, Taipei (TW); Hung-Chen Chen, Taipei (TW); Yung-Lan Tseng, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/225,440

(22) Filed: Apr. 8, 2021

(65) Prior Publication Data

US 2021/0321307 A1 Oct. 14, 2021

Related U.S. Application Data

(60) Provisional application No. 63/007,271, filed on Apr. 8, 2020.

(51) Int. Cl.
*H04W 36/00* (2009.01)
*H04W 48/18* (2009.01)
(Continued)

(52) U.S. Cl.
CPC ... *H04W 36/0072* (2013.01); *H04W 36/0083* (2013.01); *H04W 36/08* (2013.01);
(Continued)

(58) Field of Classification Search
CPC ..... H04W 36/08; H04W 48/02; H04W 48/20; H04W 84/042; H04W 36/0061; H04W 36/0077; H04W 36/06
See application file for complete search history.

(56) References Cited

U.S. PATENT DOCUMENTS

| | | |
|---|---|---|
| 2010/0035615 A1 | 2/2010 | Kitazoe et al. |
| 2012/0122460 A1 | 5/2012 | Dalsgaard et al. |

(Continued)

FOREIGN PATENT DOCUMENTS

| | | |
|---|---|---|
| CN | 102246556 A | 11/2011 |
| CN | 110475307 A | 11/2019 |

(Continued)

OTHER PUBLICATIONS

ZTE Corporation, Sanechips, "Remaining issues on the cell reselection", R2-2000357 3GPP TSG-RAN WG2 Meeting #109, E-meeting, Feb. 24-Mar. 6, 2020.

(Continued)

*Primary Examiner* — Nam T Huynh
(74) *Attorney, Agent, or Firm* — ScienBiziP, P.C.

(57) ABSTRACT

A method and a User Equipment (UE) for cell (re)selection are provided. The method includes: receiving an intra-frequency-reselection indicator in a Master Information Block (MIB) from a cell on a specific frequency; determining whether the cell belongs to a network to which the UE is registered; determining other cells on the specific frequency as barred cells that the UE is not permitted to select in an intra-frequency cell reselection, in a case that the cell belongs to the network and the intra-frequency-reselection indicator is set to a first value indicating that the intra-frequency cell reselection is not allowed to be performed; and performing the intra-frequency cell reselection to the other cells on the specific frequency, in a case that the cell does not belong to the network or the intra-frequency-reselection indicator is set to a second value indicating that the intra-frequency cell reselection is allowed to be performed.

12 Claims, 7 Drawing Sheets

(51) Int. Cl.
    *H04W 36/08*    (2009.01)
    *H04W 48/02*    (2009.01)
    *H04W 48/12*    (2009.01)
(52) U.S. Cl.
    CPC ............ *H04W 48/18* (2013.01); *H04W 48/02* (2013.01); *H04W 48/12* (2013.01)

(56) References Cited

U.S. PATENT DOCUMENTS

2021/0127312 A1* 4/2021 Bao .................. H04W 36/00837
2021/0410033 A1* 12/2021 Fu .................... H04W 36/0061

FOREIGN PATENT DOCUMENTS

| WO | 2010/016955 A1 | 2/2010 |
| WO | 2019/214203 A1 | 11/2019 |
| WO | 2020/015671 A1 | 1/2020 |

OTHER PUBLICATIONS

Nokia, Nokia Shanghai Bell, "Handling of selected CAG ID in Idle/Inactive mode", R2-2000402 3GPP TSG-RAN WG2 Meeting #109 electronic, Elbonia, Feb. 24-Mar. 6, 2020.

3GPP TS 38.331, "3rd Generation Partnership Project; Technical Specification Group Radio Access Network; NR; Radio Resource Control (RRC) protocol specification (Release 15)", Technical Specification, V15.9.0 (Mar. 2020).

* cited by examiner

METHOD AND USER EQUIPMENT FOR CELL (RE)SELECTION

CROSS-REFERENCE TO RELATED APPLICATION(S)

The present application claims the benefit of and priority to provisional U.S. Patent Application Ser. No. 63/007,271 (hereafter referred to as "the '271 provisional"), filed on Apr. 8, 2020, entitled "Method and Apparatus for Cell (Re) selection in Non-Public Network." (hereinafter referred to as "US74730 application"). The content(s) of the '271 provisional are fully incorporated herein by reference for all purposes.

FIELD

The present disclosure generally relates to wireless communication, and more particularly, to a method and a user equipment (UE) for performing cell (re)selection in the next generation wireless communication network.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to a method and a UE for cell (re)selection.

According to an aspect of the present disclosure, a method performed by a UE for cell reselection is provided. The method includes: receiving an intra-frequency-reselection indicator in a Master Information Block (MIB) from a cell on a specific frequency; determining whether the cell belongs to a network to which the UE is registered; determining other cells on the specific frequency as barred cells that the UE is not permitted to select in an intra-frequency cell reselection, in a case that the cell belongs to the network and the intra-frequency-reselection indicator is set to a first value indicating that the intra-frequency cell reselection is not allowed to be performed; and performing the intra-frequency cell reselection to the other cells on the specific frequency, in a case that the cell does not belong to the network or the intra-frequency-reselection indicator is set to a second value indicating that the intra-frequency cell reselection is allowed to be performed.

According to another aspect of the present disclosure, a UE for cell reselection is provided. The UE includes a transceiver, a processor coupled to the transceiver, and a memory coupled to the processor. The transceiver is configured to receive an intra-frequency-reselection indicator in an MIB from a cell on a specific frequency. The memory stores at least one computer-executable program that, when executed by the processor, causes the processor to: determine whether the cell belongs to a network to which the UE is registered; determine other cells on the specific frequency as barred cells that the UE is not permitted to select in an intra-frequency cell reselection, in a case that the cell belongs to the network and the intra-frequency-reselection indicator is set to a first value indicating that the intra-frequency cell reselection is not allowed to be performed; and perform the intra-frequency cell reselection to the other cells on the specific frequency, in a case that the cell does not belong to the network or the intra-frequency-reselection indicator is set to a second value indicating that the intra-frequency cell reselection is allowed to be performed.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1A:
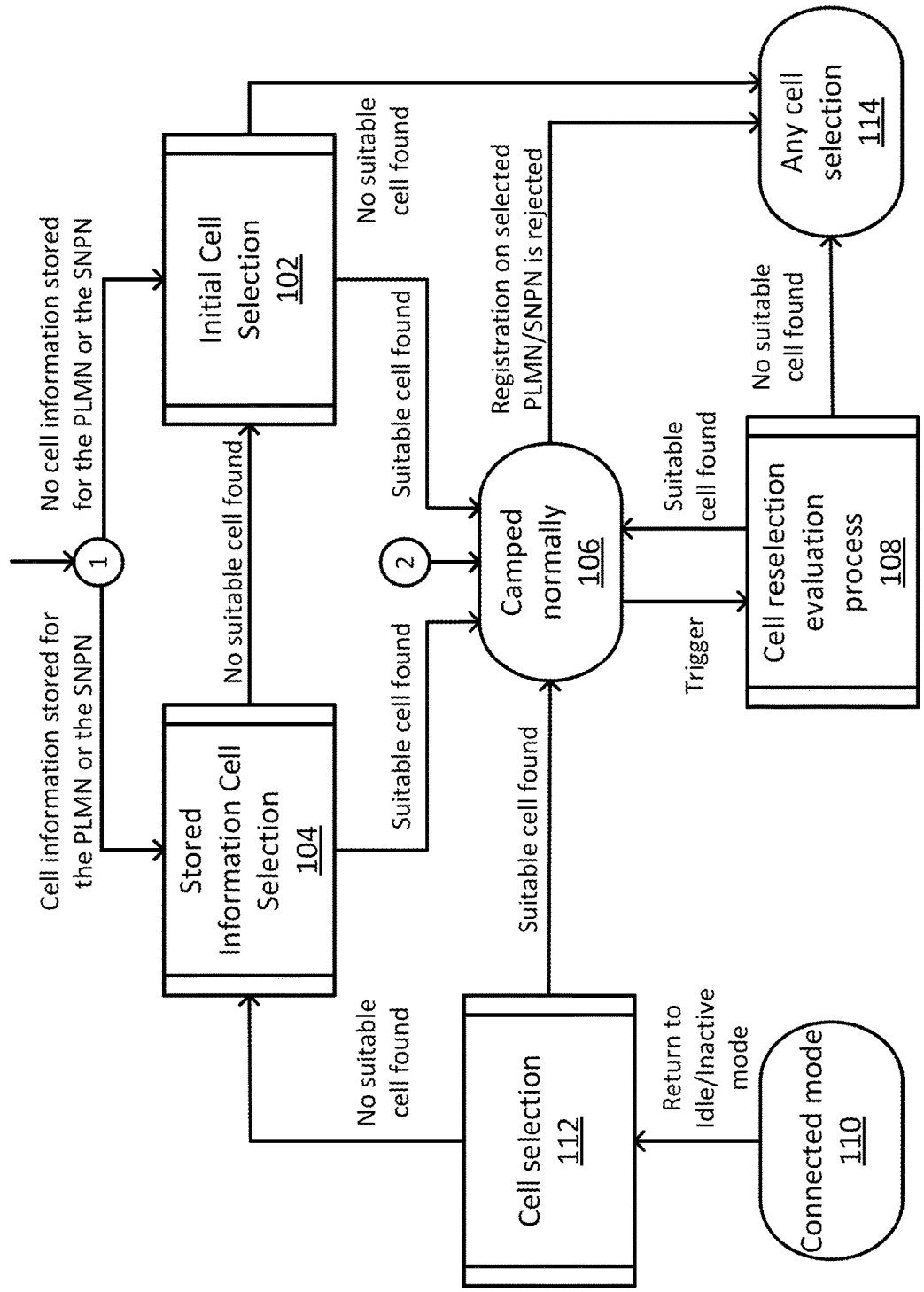
FIG. 1A shows the states and state transitions and procedures for a UE according to an implementation of the present disclosure.

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Applications Specific Integrated Circuitry (ASIC), programmable logic arrays, and/or using one or more Digital Signal Processors (DSPs). Although some of the disclosed implementations are oriented to software installed and executing on computer hardware, alternative implementations implemented as firmware or as hardware or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, and/or LTE/NR Vehicle-to-Everything (V2X) services. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. An MCG may refer to a group of serving cells associated with the Master Node (MN), comprising the SpCell and optionally one or more SCells. An SCG may refer to a group of serving cells associated with the Secondary Node (SN), comprising the SpCell and optionally one or more SCells.

As disclosed previously, the frame structure for NR supports flexible configurations for accommodating various next-generation (e.g., 5G) communication requirements such as eMBB, mMTC, and URLLC, while fulfilling high reliability, high data rate and low latency requirements. The Orthogonal Frequency-Division Multiplexing (OFDM) technology in 3GPP may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and an UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Multiple Public Land Mobile Networks (PLMNs) may operate on the unlicensed spectrum. Multiple PLMNs may share the same unlicensed carrier. The PLMNs may be public or private. Public PLMNs may be (but not limited to) operators or virtual operators, which provide radio services to the public subscribers. Public PLMNs may own the licensed spectrum and support the radio access technology on the licensed spectrum as well. Private PLMNs may be (but not limited to) micro-operators, factories, or enterprises, which provide radio services to its private users (e.g., employees or machines). Public PLMNs may support more deployment scenarios (e.g., carrier aggregation between licensed band NR (PCell) and NR-Unlicensed (NR-U) (SCell), dual connectivity between licensed band LTE (PCell) and NR-U (PSCell), stand-alone NR-U, an NR cell with DL in an unlicensed band and UL in a licensed band, dual connectivity between licensed band NR (PCell) and NR-U (PSCell)). Private PLMNs mainly support (but not limited to) stand-alone unlicensed radio access technology (e.g., stand-alone NR-U).

In the present disclosure, a connected mode may refer to a Radio Resource Control (RRC)_CONNECTED state (or simply denoted as "RRC_CONNECTED"). An idle mode may refer to an "RRC_IDLE state" (or simply denoted as "RRC_IDLE"). An inactive mode may refer to an "RRC_INACTIVE state" (or simply denoted as "RRC_INACTIVE"). A UE operating in RRC_IDLE may refer to an RRC_IDLE UE. A UE operating in RRC_INACTIVE may refer to an RRC_INACTIVE UE. A UE operating in RRC_CONNECTED may refer to an RRC_CONNECTED UE.

In order to fulfil the low latency and high reliability requirements for the vertical industry and support 5G Local Area Network (LAN)-type service and dedicated wireless networks, e.g., private networks, there is a need to improve the mechanism of cell (re)selection for the next-generation cellular network.

The private network (e.g., Non-Public Network (NPN)) may support vertical and LAN services. The private network may be classified into Single Non-Public Network (SNPN) and Public Network Integrated Non-Public Network (PNI-NPN). Operators may focus on the PNI-NPN solutions applicable for a much wider range of use cases such as Small Office Home Office (SOHO) and residential, private network coverage deployments and so on.

The 5G system will be enhanced to support the NPN. Two network identifies are introduced for NPN: Network Identifier/Identity (ID) (NID) and Closed Access Group (CAG) ID. A 5G RAN may also implement the NPN by enhancing the features such as NPN identification, discovery, selection/reselection, access control and mobility restrictions.

When NPN scenarios are considered, various UE types and cell types may be introduced. For example, a UE may be "a UE in SNPN Access Mode" or "a UE in non-SNPN Access Mode (i.e., a UE not operating in SNPN Access Mode)". A cell may be one of an "SNPN cell", a "CAG cell", a "PLMN cell", "a cell supporting at least SNPN deployments" (e.g., a cell broadcasts SNPN ID(s), identifying the SNPN(s) that the cell supports, where an SNPN ID may include a PLMN ID and/or an NID), "a cell supporting at least PNI-NPN deployments" (e.g., a cell broadcasts PNI-NPN ID(s), identifying the PNI-NPN(s) that the cell supports, where a PNI-NPN ID may include a PLMN ID and/or a CAG ID), "a cell supporting at least PLMN deployments" (e.g., a cell broadcasts PLMN ID(s), identifying the PLMN(s) that the cell supports), "a cell supporting at least SNPN and PNI-NPN deployments", "a cell supporting at least SNPN and PLMN deployments", "a cell supporting at least PNI-NPN and PLMN deployments", "a cell supporting SNPN, PNI-NPN and PLMN deployments", etc. However, the UE behavior of different UE types for different cell types, especially in the substates (e.g., camped normally state, any cell selection state, camped on any cell state) in RRC_IDLE/RRC_INACTIVE, is not clear.

The UE behavior of different UE types for different cell types, especially in the sub states (e.g., camped normally state, any cell selection state, camped on any cell state) in RRC_IDLE/RRC_INACTIVE are provided in the present disclosure. Furthermore, the cell reselection evaluation process, the definition of an acceptable cell, selection of a cell at transition to RRC_IDLE or RRC_INACTIVE state, and cells with cell reservations, access restrictions or unsuitable for normal camping, especially for the RRC_IDLE/RRC_INACTIVE scenarios are also provided. Moreover, a UE in SNPN Access Mode transitioning to non-SNPN Access Mode is disclosed. The handling of an intra-frequency-reselection indicator is also disclosed.

Any Cell Selection State in an SNPN

Figure 1B:
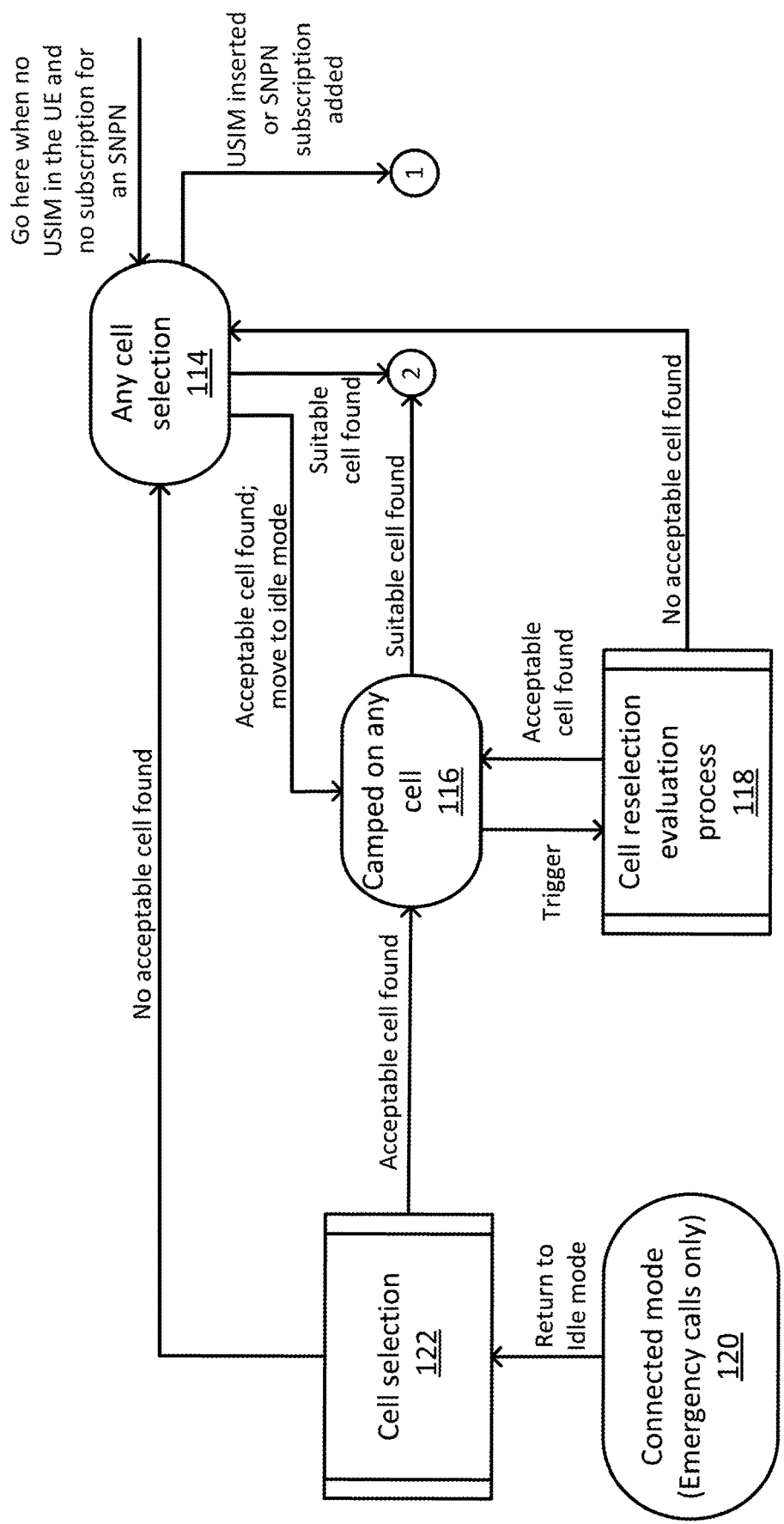
FIG. 1B shows the states and state transitions and procedures for a UE according to an implementation of the present disclosure.

FIGS. 1A and 1B show the states and state transitions and procedures for a UE according to an implementation of the present disclosure. As shown in FIG. 1A, whenever a new PLMN selection or a new SNPN selection is performed by a UE, it may cause an exit to Node 1. When the UE (e.g., in SNPN Access Mode) selects an SNPN or when the UE (e.g., in non-SNPN Access Mode) selects a PLMN, the UE may perform the initial cell selection 102 if the UE has no cell information stored for the selected SNPN or PLMN, respectively. When the UE (e.g., in SNPN Access Mode) selects an SNPN or when the UE (e.g., in non-SNPN Access Mode) selects a PLMN, the UE may perform the stored information cell selection 104 if the UE has stored cell information for the selected SNPN or PLMN, respectively. If the UE does not find any suitable cell during the stored information cell selection 104, the UE may return to perform the initial cell selection 102. If the UE finds at least one suitable cell during the initial cell selection 102 or the stored information cell selection 104, the UE may enter the camped normally state 106. If the UE does not find any suitable cell during the initial cell selection 102, the UE may enter the any cell selection state 114.

On the other hand, if the UE operating in the connected mode 110 returns to the idle mode or the inactive mode, the UE may perform the cell selection 112 upon leaving the connected mode 110. If the UE finds at least one suitable cell in the cell selection 112, the UE may enter the camped normally state 106. If the UE does not find any suitable cell in the cell selection 112, the UE may perform the stored information cell selection 104.

When the UE is in the camped normally state 106, the UE may trigger cell reselection evaluation process 108 to search for the suitable cell(s). The UE may enter (or stay in) the camped normally state 106 if the UE finds at least one suitable cell during the cell reselection evaluation process 108. If the UE does not find any suitable cell during the cell reselection evaluation process 108, the UE may enter the any cell selection state 114. When the UE is in the camped normally state 106 and the Non-Access Stratum (NAS) layer of the UE indicates that the registration on selected PLMN/SNPN is rejected, the UE may enter the any cell selection state 114.

Referring to FIG. 1B, state transitions and procedures after the UE enters the any cell selection state 114 are shown. As illustrated in FIG. 1B, when no Universal Subscriber Identity Module (USIM) is inserted to the UE and no subscription for an SNPN, the UE may enter the any cell selection state 114. The UE may leave the any cell selection state 114 and enter Node 2 (which connects to the camped normally state 106 in FIG. 1A) if the UE finds at least one suitable cell in the any cell selection state 114. If the UE does not find any suitable cell but finds at least one acceptable cell (and/or moves to the idle mode) in the any cell selection state 114, the UE may enter the camped on any cell state 116. When the UE is in the camped on any cell state 116, the UE may trigger the cell reselection evaluation process 118. If the UE finds at least one acceptable cell during the cell reselection evaluation process 118, the UE may enter (or stay in) the camped on any cell state 116. If the UE does not find any acceptable cell during the cell reselection evaluation process 118, the UE may return to the any cell selection state 114. If the UE finds at least one suitable cell in the camped on any cell state 116, the UE may enter Node 2 to return to the camped normally state 106 in FIG. 1A.

If the UE operating in the connected mode 120 (which provides services for emergency calls only) returns to the idle mode, the UE may perform the cell selection 122 upon leaving the connected mode 120. If the UE finds at least one acceptable cell during the cell selection 122, the UE may enter the camped on any cell state 116. If the UE does not find any acceptable cell in the cell selection 122, the UE may enter the any cell selection state 114.

For a UE operating in SNPN Access Mode, a cell may be considered as a suitable cell if at least one of the following conditions (1) to (4) are fulfilled:

(1) The cell is part of either the selected SNPN or the registered SNPN of the UE.

(2) The cell selection criterion of the cell is fulfilled.

(3) The cell is not barred according to the latest information provided by the NAS layer.

(4) According to the latest information provided by the NAS layer, the cell is part of at least one Tracking Area (TA) that is not part of the list of "Forbidden Tracking Areas" which belongs to either the selected SNPN or the registered SNPN of the UE.

For condition (1), the cell may broadcast at least one SNPN identity via System Information Block (SIB) Type 1 (SIB1). After receiving the SNPN identity, the UE may determine whether each SNPN identity matches an identity of the UE's selected SNPN or the UE's registered SNPN.

For condition (2), the cell selection criterion S may be considered fulfilled when the cell selection receive (RX) level value (dB) is greater than zero and the cell selection quality value (dB) is greater than zero. The UE may derive the cell selection RX level value based on a measured cell RX level value (e.g., a Reference Signal Received Quality (RSRP) value), a minimum required RX level in the cell (dBm), an offset to the signaled minimum required RX level in the cell (dBm), parameters specific for SNPN, etc. The minimum required RX level in the cell (dBm) may be impacted by SNPN deployments/operation or parameters specific for the SNPN. The offset to the signaled minimum required RX level in the cell (dBm) may be impacted by SNPN deployments/operation or parameters specific for the SNPN (e.g., a (periodic) search for SNPN, a (periodic) search for SNPN while the UE is in SNPN Access Mode, a (periodic) search for SNPN while the UE is in non-SNPN Access Mode (e.g., while the UE camps normally in a PLMN or Visiting PLMN). The cell selection RX level value (or parameters or formula) may be adjusted (e.g., the serving/camped cell may indicate the adjusted value to the UE via broadcast information or via dedicated signaling, the UE may adjust by itself (e.g., based on preconfigured values)) if the UE operates in SNPN Access Mode compared to the case if the UE operates in non-SNPN Access Mode (e.g., the UE may perform normal PLMN selection in non-SNPN Access Mode or operate in a PNI-NPN). The UE may derive the cell selection quality value based on a measured cell quality value (e.g., a Reference Signal Received Quality (RSRQ) value), a minimum required quality level in the cell (dB), an offset to the signaled minimum required quality level in the cell (dB), parameters specific for SNPN, etc. The minimum required quality level in the cell (dB) may be impacted by SNPN deployments/operation or parameters specific for the SNPN. The offset to the signaled minimum required quality level in the cell (dB) may be impacted by SNPN deployments/operation or parameters specific for the SNPN (e.g., a (periodic) search for the SNPN, a (periodic) search for the SNPN while the UE is in SNPN Access Mode, a (periodic) search for the SNPN while the UE is in non-SNPN Access Mode (e.g., while the UE camps normally in a PLMN or Visiting PLMN)). The cell selection quality value (or parameters or formula) may be adjusted (e.g., the serving/camped cell may indicate the adjusted value to the UE via broadcast information or via dedicated signaling, the UE may adjust by itself (e.g., based on preconfigured values)) if the UE operates in SNPN Access Mode compared to the case of the UE operating in non-SNPN Access Mode (e.g., the UE may perform normal PLMN selection in non-SNPN Access Mode or operate in a PNI-NPN)

Cell reselection evaluation process (Ranking mechanism for a RAN-sharing case)

The UE (e.g., in SNPN Access Mode) may perform ranking of all cells that fulfil the cell selection criterion S. The ranking of all cells may correspond to the R criterion. The ranking of cells may consider an NPN-related factor (e.g., $Q_{SNPN}$). The NPN-related factor may be an (RSRP) offset used for NPN (e.g., SNPN or PNI-NPN) scenarios.

$$R_s = Q_{meas,s} + Q_{hyst} - Qoffset_{temp}$$

$$R_n = Q_{meas,n} - Q_{offset} - Qoffset_{temp} + Q_{SNPN}$$

where:

| | |
|---|---|
| $Q_{meas}$ | RSRP measurement quantity used in cell reselections. |
| Qoffset | For intra-frequency: Equal to $Qoffset_{s,n}$, if $Qoffset_{s,n}$ is valid, otherwise this is equal to zero. For inter-frequency: Equal to $Qoffset_{s,n}$ plus $Qoffset_{frequency}$, if $Qoffset_{s,n}$ is valid, otherwise this is equal to $Qoffset_{frequency}$. |
| $Qoffset_{temp}$ | Offset temporarily applied to a cell as specified in TS 38.331. |

During the cell reselection evaluation process (e.g., the cell reselection evaluation process 108 or 118 shown in FIGS. 1A and 1B), the UE (e.g., in SNPN Access Mode) may attempt to find a suitable cell on which to camp. The cell reselection evaluation process may also be used to search for the acceptable cell(s) if no suitable cell is found. For example, among all candidate cells (e.g., the cells that fulfill the cell selection criterion S), the UE may rank each of the candidate cells based on (1) whether the candidate cell supports NPN and/or NPN-only, (2) whether the candidate cell supports PLMN and/or PLMN only, (3) whether the candidate cell supports SNPN and/or SNPN-only, (4) whether the cells supports RAN sharing, (5) the number of SNPN identities, PNI-NPN identities and/or PLMN identities broadcast by the cells, (6) the number of SNPN identities, PNI-NPN identities and/or PLMN identities, where each of the SNPN identities, PNI-NPN identities and/or PLMN identities may be broadcast by the cell and match the UE's supporting/selected/registered SNPN identities, PNI-NPN identities and/or PLMN identities, and/or (7) the received signal strength (e.g., RSRP/RSRQ/Received Signal Strength Indication, RSSI).

During the cell reselection evaluation process, the UE may perform ranking of all candidate cells that fulfill the cell selection criterion S and also fulfill a certain R threshold value (e.g., $R_n$ is greater than or equal to $R_{th}$, where $R_{th}$ is an R threshold value). $R_{th}$ may be preconfigured to the UE. The UE may receive $R_{th}$ via broadcasting message (e.g., SIB1 and/or other System Information Blocks (SIBs)) from the camped-on/serving cell. The UE may receive $R_th$ via dedicated signaling from the camped-on/serving cell. Among all candidate cells (e.g., the cells that fulfill the cell selection criterion S and also fulfill a certain R threshold value), the UE may rank all the candidate cells based on (1) whether the cells support NPN and/or NPN-only, (2) whether the cells support PLMN and/or PLMN only, (3) whether the cells support SNPN and/or SNPN-only, (4) whether the cells support RAN sharing, (5) the number of SNPN identities, PNI-NPN identities and/or PLMN identities broadcast by the cells, (6) the number of SNPN identities, PNI-NPN identities and/or PLMN identities, where each of the SNPN identities, PNI-NPN identities and/or PLMN identities may be broadcast by the cells and match the UE's supporting/ selected/registered SNPN identities, PNI-NPN identities and/or PLMN identities, and/or (7) the received signal strength (e.g., RSRP/RSRQ/RSSI).

In the cell reselection evaluation process (e.g., the cell reselection evaluation process 108 or 118 shown in FIGS. 1A and 1B), a UE (e.g., in SNPN Access Mode) may determine whether a cell can be selected as a candidate cell for cell (re)selection, and/or rank one or more cells (e.g., candidate cells) to find suitable cell(s)/acceptable cell(s).

For example, the UE (e.g., in SNPN Access Mode) may rank the candidate cells which broadcast at least one SNPN identity. The UE may rank the candidate cells which broadcast SNPN identities only (e.g., the candidate cells to be ranked do not broadcast PLMN identities, the candidate cells to be ranked do not broadcast any PLMN identities with associated Network identities and/or CAG identities, or the candidate cells to be ranked do not broadcast CAG identities). The UE may not consider a cell, which broadcasts only the PLMN identities without associated Network identities and without associated CAG identities, as a candidate cell for ranking and/or for cell reselection. The UE may not consider a cell, which broadcasts PLMN identities with associated CAG identities, as a candidate cell for ranking and/or for cell reselection. The UE may consider a cell, which broadcasts only the PLMN identities without the associated Network identities and/or CAG identities, as a candidate cell, but the UE may not rank such cell for cell reselection. The UE may consider the number of SNPN identities, PLMN identities, and PNI-NPN identities broadcast by the candidate cells as one factor to rank the candidate cells. The UE may rank the cell, which broadcasts the greatest number of SNPN identities, to have the highest rank among all candidate cells, and rank the cell, which broadcasts the least number of SNPN identities, to have the lowest rank among all candidate cells. The cells, which broadcast the same number of SNPN identities, may have the same rank among all candidate cells. The UE may rank the cells, which broadcast the same number of SNPN identities, based on the received signal strength (e.g., RSRP/RSRQ/RSSI). The UE may rank one cell with the stronger received signal strength with a higher rank than another cell with the weaker received signal strength, wherein these two cells broadcast the same number of SNPN identities.

If the UE supports operation in at least one SNPN indicated by at least one SNPN identity (e.g., the UE is preconfigured with a list of (equivalent) SNPN identities identifying a list of SNPNs that the UE can support), the UE may consider the number of the matched SNPN identities which are broadcast by the candidate cells and are also supported by the UE itself, as one factor to rank the candidate cells. The UE may rank the cell, which has the greatest number of matched SNPN identities, to have the highest rank among all candidate cells. The UE may rank the cell, which has the least number of matched SNPN identities, to have the lowest rank among all candidate cells. The UE may rank the cell, which has the same number of matched SNPN identities, to have the same rank among all candidate cells. The UE may rank the cell, which has the same number of matched SNPN identities, based on the received signal strength (e.g., RSRP/RSRQ/RSSI). The UE may rank one cell with the stronger received signal strength to have a higher rank than another cell with a weaker received signal strength, wherein these two cells may have the same number of matched SNPN identities.

During the cell reselection evaluation process, the UE may select the candidate cell with the highest ranking and check whether such cell fulfills suitable cell requirements. If the candidate cell with the highest rank fulfills the suitable cell requirements, the UE may determine such cell as a suitable cell. If the candidate cell with the highest rank does not fulfill the suitable cell requirements, the UE may select the candidate cell with the second highest rank and check whether such cell (with the second highest rank) fulfills the suitable cell requirements. If the candidate cell with the second highest rank fulfills the suitable cell requirement, the UE may determine such cell as a suitable cell. If the candidate cell with the second highest rank does not fulfill the suitable cell requirements, the UE may continue to check whether the candidate cell with the next highest rank (e.g., the third highest rank, if exists) is a suitable cell according to the suitable cell requirements.

If the UE cannot find any candidate cell which broadcasts at least one SNPN identity or if the UE cannot find any suitable cell during the cell reselection evaluation process 108, the UE may enter the any cell selection state (e.g., the any cell selection state 114 illustrated in FIGS. 1A and 1B).

UE behavior in the any cell selection state

The any cell selection state (e.g., the any cell selection state 114 shown in FIGS. 1A and 1B) may be applicable for a UE (e.g., in SNPN Access Mode) operating in RRC_IDLE or RRC_INACTIVE. In the any cell selection state, the UE may try to find a suitable cell on which to camp (e.g., by performing a cell (re)selection process). If the UE does not find any suitable cell after scanning certain RAT(s) and frequency band(s) supported by the UE, the UE may attempt to find an acceptable cell of any PLMN/SNPN/CAG on which to camp, by trying to access the RAT(s) that are supported by the UE, and searching first for a high-quality cell. The measured RSRP value (e.g., the RSRP of a Synchronization Signal Block (SSB), or the RSRP of a Channel Status Information-Reference Signal (CSI-RS)) of the high-quality cell may be greater than or equal to a predetermined threshold/value (e.g., "−110 dBm").

RATs and frequency bands that support at least PLMN deployments may include (a) RATs and frequency bands that support PLMN deployments only, (b) RATs and frequency bands that support PLMN deployments and PNI-NPN deployments, (c) RATs and frequency bands that support PLMN deployments and SNPN deployments, and/or (d) RATs and frequency bands that support PLMN deployments, PNI-NPN deployments, and SNPN deployments, for example, when network sharing and/or RAN sharing among a PLMN, a PNI-NPN and/or an SNPN is considered.

An RRC_IDLE/RRC_INACTIVE UE that fails to camp on any cell may stay in the any cell selection state (e.g., the any cell selection state 114 in FIG. 1B).

UE in SNPN Access Mode—UE Behavior in the any Cell Selection State

A UE in SNPN Access Mode may refer to a UE that operates in SNPN scenarios. For example, a UE in SNPN Access Mode may be an advanced UE with the support of the SNPN (e.g., a Release-16 (Rel-16) (or beyond) NR UE with the support of the SNPN and without the support of the PLMN, a Rel-16 (or beyond) NR UE with the support of the SNPN and PLMN, a Rel-16 (or beyond) NR UE with the support of the SNPN and without the support of the PNI-NPN, a Rel-16 (or beyond) NR with the support of the SNPN and PNI-NPN, or a Rel-16 (or beyond) NR with the support of the SNPN, PNI-NPN and PLMN). The UE may be preconfigured in SNPN Access Mode or in non-SNPN Access Mode. The UE may be configured, e.g., by the NAS layer of the UE itself, by the core network (e.g., Access and Mobility Management Function (AMF)) via a cell to the NAS layer of the UE, whether the UE is in SNPN Access Mode or in non-SNPN Access Mode.

If the UE in SNPN Access Mode fails to find a suitable cell after performing a complete scan of all RATs and all frequency bands for SNPN deployments (e.g., based on the stored cell information), e.g., the UE has scanned for RATs and frequency bands that support SNPN deployments or has scanned for NR (rather than LTE, UMTS, and/or GSM) and all frequency bands that support SNPN deployments, the UE may attempt to find any cell (among the following types (1) to (7) of cells), and/or try all RATs for SNPN deployments (e.g., NR rather than LTE, GSM, and/or UMTS) that are supported by the UE, and/or search first for a high-quality cell (e.g., a cell with its measured RSRP value (e.g., the RSRP of an SSB or the RSRP of a CSI-RS) greater than or equal to −110 dBm). The UE may search for at least one high-quality cell. The any cell may be found from the following types (1) to (7) of cells:

(1) acceptable cells supporting the SNPN (only) (e.g., the selected SNPN of the UE, the registered SNPN of the UE, any SNPN);

(2) CAG-only acceptable cells (e.g., a CAG-only acceptable cell may only support a PNI-NPN, and the PLMN ID associated with the CAG ID broadcast by the CAG-only acceptable cell may be a default PLMN ID);

(3) PLMN-only acceptable cells (e.g., a PLMN-only acceptable cell may not support an SNPN and a PNI-NPN, the PLMN operating the PLMN-only acceptable cell may be a default PLMN, and the PLMN ID broadcast by the PLMN-only acceptable cell may be a default PLMN ID);

(4) acceptable cells supporting an SNPN (e.g., the selected SNPN of the UE, the registered SNPN of the UE, any SNPN) and a PNI-NPN (e.g., the PLMN ID associated with the CAG ID broadcast by the acceptable cell may be a default PLMN ID);

(5) acceptable cells supporting an SNPN (e.g., the selected SNPN of the UE, the registered SNPN of the UE, any SNPN) and a PLMN (e.g., the PLMN operating the acceptable cell may be a default PLMN, and the PLMN ID broadcast by the acceptable cell may be a default PLMN ID);

(6) acceptable cells supporting a PNI-NPN (e.g., the PLMN ID associated with the CAG ID broadcast by the acceptable cell may be a default PLMN ID) and a PLMN (e.g., the PLMN operating the acceptable cell may be a default PLMN, and the PLMN ID broadcast by the acceptable cell may be a default PLMN ID);

(7) acceptable cells supporting an SNPN (e.g., the selected SNPN, the registered SNPN, any SNPN), a PNI-NPN (e.g., the PLMN ID associated with the CAG ID broadcast by the acceptable cell may be a default PLMN ID), and a PLMN (e.g., the PLMN operating the acceptable cell may be a default PLMN, and the PLMN ID broadcast by the acceptable cell may be a default PLMN ID) on which to camp.

The UE may determine which cell on which to camp according to a priority order of the types of cells. For example, the priority of a first group including type (1), type (4), type (5) and/or type (7), may be higher than the priority of a second group including type (2), type (3) and/or type (6). If the UE finds at least two cells with high-quality, the UE may camp on one of the at least two cells belonging to the group with higher priority. If the UE finds at least two cells with high-quality and belonging to the group with the same priority, the UE may randomly camp on one of the at least two cells. If the UE finds at least two cells with high-quality and belonging to the group with the same priority, the UE may camp on the cell with the highest quality.

As described previously, a PLMN that fulfills certain conditions may be considered as a default PLMN. The default PLMN may be a UE's (e.g., a UE in SNPN Access Mode) previously selected/registered PLMN. The UE (e.g., in non-SNPN Access Mode) may store the selected/registered PLMN ID associated with the UE's selected/registered PLMN. When the UE transitions from non-SNPN Access Mode to SNPN Access Mode, the UE may not clear/release the stored selected/registered PLMN ID associated with the selected/registered PLMN. The default PLMN may be a preconfigured PLMN (e.g., preconfigured by the core network or preconfigured by the USIM). The default PLMN may be associated with a default PLMN ID, which may be a dummy PLMN ID and/or a fixed PLMN ID. The fixed PLMN ID may be globally unique, or locally unique (e.g., unique for an SNPN).

If the UE in SNPN Access Mode does not find any SNPN cells nearby (for example, if the UE in SNPN Access Mode does not find any SNPN cells before an SNPN search timer expires), the RRC layer of the UE in SNPN Access Mode may indicate the status information (e.g., no SNPN cells are found) to the NAS layer of the UE. Upon receiving the status information, the NAS layer of the UE may change the SNPN Access Mode to the non-SNPN Access Mode (e.g., if the UE supports a normal PLMN and/or a PNI-NPN). Upon receiving the status information, the NAS layer of the UE may (re)start a suspension_NAS timer. The NAS layer of the UE may instruct the RRC layer of the UE to perform power saving (e.g., by entering a sleep mode) for a period of time. The UE may stay in the any cell selection state and perform power saving. When the UE performs power saving or when the UE enters the sleep mode, the UE may suspend the cell reselection evaluation process (e.g., the cell reselection evaluation process 108 or 118). When the suspension_NAS timer expires, the NAS layer of the UE may instruct the RRC layer of the UE to perform the cell reselection evaluation process.

Upon receiving the instruction (e.g., for power saving and/or for suspending a cell reselection evaluation process) from the NAS layer of the UE, the Access Stratum (AS) layer (e.g., RRC layer) of the UE may (re)start the suspension_AS timer. When the suspension_AS timer expires, the AS layer (e.g., RRC layer) of the UE may perform the cell reselection evaluation process. The UE may be preconfigured with an SNPN search timer by the network (e.g., via dedicated signaling or system information) or by the USIM. The UE may receive an SNPN search timer from the network during the RRC state transition. For example, the SNPN search timer may be received in an RRC Release message including a suspend configuration when the UE transitions from RRC_CONNECTED to RRC_INACTIVE. The SNPN search timer may be received in an RRC Release message without a suspend configuration when an RRC_INACTIVE UE transitions to RRC_IDLE. The SNPN search timer may be received via an RRC Release message without a suspend configuration when an RRC_CONNECTED UE transitions to RRC_IDLE. If the UE is configured with a new SNPN search timer during the RRC state transition, the UE may replace the preconfigured SNPN search timer with the newly configured SNPN search timer. When the UE receives an SNPN search timer from the network, the UE may replace the stored SNPN search timer with the newly configured SNPN search timer.

The UE may (re)start the SNPN search timer when the UE enters the any cell selection state (e.g., the any cell selection state 114). The UE may start the SNPN search timer when the UE performs the cell reselection evaluation process (e.g., the cell reselection evaluation process 108 or 118) and/or searches for a suitable cell supporting (only/at least) the SNPN and/or an acceptable cell supporting (only/at least) the SNPN. The UE may stop the SNPN search timer when the UE camps on and/or finds a suitable cell supporting (only/at least) the SNPN and/or an acceptable cell supporting (only/at least) the SNPN.

The UE may be preconfigured with a suspension_NAS timer (e.g., in the NAS layer of the UE) by the network or by the USIM. The UE may receive the configuration of the suspension_NAS timer from the network (e.g., from a serving cell, a core network, or an AMF) included in the RRC message. The UE may receive an RRC message from the network, wherein the RRC message includes NAS information including the configuration of the suspension_NAS timer. The UE may receive the RRC message from the network during RRC state transition (e.g., via an RRC Release message without suspend configuration for transitioning from RRC_CONNECTED to RRC_IDLE, via an RRC Release message without a suspend configuration for transitioning from RRC_INACTIVE to RRC_IDLE, via an RRC Release message with a suspend configuration for transitioning from RRC_CONNECTED to RRC_INACTIVE) or when operating in RRC_CONNECTED (e.g., via an RRC Reconfiguration message). Upon receiving an RRC message including NAS information including the configuration of the suspension_NAS timer, the RRC layer of the UE may forward the NAS information to the NAS layer of the UE. If the UE is configured with the suspension_NAS timer during the RRC state transition or when operating in RRC_CONNECTED, the UE may replace the preconfigured suspension_NAS timer with the newly configured suspension_NAS timer. When the UE receives a newly configured suspension_NAS timer, the UE may replace the stored suspension_NAS timer with the newly configured suspension_NAS timer.

The UE may be preconfigured with a suspension_AS timer by the network (e.g., via dedicated signaling, via system information) or by the USIM. The UE may receive a suspension_AS timer from the network during an RRC state transition from RRC_CONNECTED to RRC_INACTIVE (e.g., via an RRC Release message including suspend configuration), during an RRC state transition from RRC_INACTIVE to RRC_IDLE (e.g., via an RRC Release message without a suspend configuration), or during an RRC state transition from RRC_CONNECTED to RRC_IDLE (e.g., via an RRC Release message without a suspend configuration). If the UE is configured with a new suspension_AS timer during an RRC state transition, the UE may replace the preconfigured suspension_AS timer with the newly configured suspension_AS timer. When the UE receives the newly configured suspension_AS timer, the UE may replace the stored suspension_AS timer with the newly configured suspension_AS timer.

When the UE transitions from a first RRC state (e.g., RRC_INACTIVE) to a second RRC state (e.g., RRC_IDLE), the UE may release (or reset) the SNPN search timer and/or the suspension_NAS timer, which the UE may maintain or which may run while the UE is in the first RRC state (e.g., RRC_INACTIVE). After transitioning to the second RRC state (e.g., RRC_IDLE), the UE in the second RRC state may (re)start the SNPN search timer and/or the suspension_NAS timer based on the corresponding value(s), which the UE may receive via broadcast information and/or via dedicated signaling from the serving/camped cell, and/or be preconfigured by the network/USIM. However, when the UE transitions from the first RRC state (e.g., RRC_INACTIVE) to the second RRC state (e.g., RRC_IDLE), the UE may not release (or may not reset) the SNPN search timer and/or the suspension_NAS timer, which the UE may maintain or which may run while the UE is in the first RRC state (e.g., RRC_INACTIVE). The UE in the second RRC state (e.g., RRC_IDLE) may continue to run the timer based on the corresponding value(s) while the UE is in the first RRC state (e.g., RRC_INACTIVE).

If the UE in SNPN Access Mode enters the any cell selection state (e.g., the any cell selection state 114), the RRC layer of the UE may inform the NAS layer of the UE. The NAS layer of the UE may change the SNPN Access Mode to the non-SNPN Access Mode, if the UE also supports the PNI-NPN and/or PLMN deployments. If the RRC layer of the UE informs the NAS layer of the UE of the status information, the NAS layer of the UE may change the SNPN Access Mode to the non-SNPN Access Mode, if the UE also supports the PNI-NPN and/or PLMN deployments.

If the UE transitions to the non-SNPN Access Mode, the UE may perform a PLMN selection (e.g., based on the stored information). If the UE transitions to the non-SNPN Access Mode, the UE may leave the any cell selection state. If the UE transitions to the non-SNPN Access Mode, the UE may store the information used for operating in the SNPN Access Mode. If the UE transitions to the non-SNPN Access Mode, the UE may remove the information used for operating in SNPN Access Mode.

UE in the Non-SNPN Access Mode—UE Behavior in the any Cell Selection State

A UE in the non-SNPN Access Mode with a selected/registered CAG ID may refer to a UE operating in PNI-NPN scenarios. A UE in the non-SNPN Access Mode without a selected/registered CAG ID may refer to a UE operating in PLMN scenarios rather than PNI-NPN scenarios. A UE in the non-SNPN Access Mode may be (1) a legacy UE without the support of the NPN (e.g., Release-15 (Rel-15) NR UE, LTE UE), (2) an advanced UE with the support of the NPN (e.g., Rel-16 (or beyond) or an NR UE with the support of the NPN and PLMN), or (3) an advanced UE without the support of the NPN (e.g., Rel-16 (or beyond) or an NR UE with the support of PLMN only without the support of the NPN).

If the UE in the non-SNPN Access Mode fails to find a suitable cell after performing a complete scan of all RATs and all frequency bands for non-SNPN deployments (e.g., at least PLMN deployments or at least PNI-NPN deployments) (e.g., based on stored cell information), e.g., the UE in non-SNPN Access Mode scans for RATs and frequency bands that does not support SNPN deployments or scan for NR, LTE, UMTS, and/or GSM and all frequency bands that does not support SNPN deployments, the UE may attempt to find any cell (among the following types (8) to (14) of cells), and/or try all RATs for PLMN deployments and/or PNI-NPN deployments (e.g., NR, LTE, GSM, and/or UMTS, which does not support the PNI-NPN, NR which supports the PNI-NPN) that are supported by the UE, and/or search first for a high-quality cell (e.g., a cell with a measured RSRP value (e.g., RSRP of SSB, RSRP of CSI-RS) greater than or equal to −110 dBm). The any cell may be found among following types (8) to (14) of cells:

(8) acceptable cells of the SNPN (e.g., the selected SNPN when the UE was in SNPN Access Mode, the registered SNPN when the UE was in SNPN Access Mode, any SNPN, or the default SNPN);

(9) CAG-only acceptable cells (e.g., the CAG-only acceptable cell may only support a PNI-NPN, the PLMN ID associated with a CAG ID broadcast by the CAG-only acceptable cell may be a default PLMN ID, the CAG ID broadcast by the CAG-only acceptable cell may be any CAG ID rather than the UE's selected/registered CAG ID for a UE in non-SNPN Access Mode with a selected/registered CAG ID, the PLMN ID broadcast by the CAG-only acceptable cell may be any PLMN ID rather than the registered/selected PLMN ID associated with the UE's selected/registered CAG ID for a UE in non-SNPN Access Mode with a selected/registered CAG ID, the CAG ID broadcast by the CAG-only acceptable cell may be any CAG ID for a UE in non-SNPN Access Mode without a selected/registered CAG ID, the PLMN ID broadcast by the CAG-only acceptable cell may be any PLMN ID rather than the registered/selected PLMN ID for a UE in non-SNPN Access Mode without a selected/registered CAG ID);

(10) PLMN-only acceptable cells (e.g., this cell may not support the SNPN and PNI-NPN, the PLMN operating this cell may be a default PLMN, the PLMN ID broadcast by this cell may be a default PLMN ID, the PLMN ID broadcast by this cell may be any PLMN ID rather than the PLMN ID associated with the UE's selected/registered CAG ID for a UE in non-SNPN Access Mode with a selected/registered CAG ID, the PLMN ID broadcast by this cell may be any PLMN ID rather than the PLMN ID associated with the UE's selected/registered PLMN ID for a UE in non-SNPN Access Mode without a selected/registered CAG ID);

(11) acceptable cells supporting the SNPN (e.g., the selected SNPN when the UE was in SNPN Access Mode, the registered SNPN when the UE was in SNPN Access Mode, any SNPN, or the default SNPN) and the PNI-NPN (e.g., the PLMN ID associated with the CAG ID broadcast by the acceptable cell may be a default PLMN ID, the CAG ID broadcast by the acceptable cell may be any CAG ID rather than the UE's selected/registered CAG ID for a UE in non-SNPN Access Mode with a selected/registered CAG ID, the PLMN ID broadcast by the acceptable cell may be any PLMN ID rather than the registered/selected PLMN ID associated with the UE's selected/registered CAG ID for a UE in non-SNPN Access Mode with a selected/registered CAG ID, the CAG ID broadcast by the acceptable cell may be any CAG ID for a UE in non-SNPN Access Mode without a selected/registered CAG ID, the PLMN ID broadcast by the acceptable cell may be any PLMN ID rather than the registered/selected PLMN ID for a UE in non-SNPN Access Mode without a selected/registered CAG ID);

(12) acceptable cells supporting the SNPN (e.g., the selected SNPN when the UE was in SNPN Access Mode, the registered SNPN when the UE was in SNPN Access Mode, any SNPN, or a default SNPN) and PLMN (e.g., the PLMN operating the acceptable cell may be a default PLMN, the PLMN ID broadcast by the acceptable cell may be a default PLMN ID, the acceptable cell may not support SNPN and PNI-NPN, the PLMN ID broadcast by the acceptable cell may be any PLMN ID rather than the PLMN ID associated with the UE's selected/registered CAG ID for the UE in non-SNPN Access Mode with a selected/registered CAG ID, the PLMN ID broadcast by the acceptable cell may be any PLMN ID rather than the PLMN ID associated with the UE's selected/registered PLMN ID for a UE in non-SNPN Access Mode without a selected/registered CAG ID);

(13) acceptable cells supporting the PNI-NPN (e.g., the PLMN ID associated with the CAG ID broadcast by the acceptable cell may be a default PLMN ID, the CAG ID broadcast by the acceptable cell may be any CAG ID rather than the UE's selected/registered CAG ID for a UE in non-SNPN Access Mode with a selected/registered CAG ID, the PLMN ID broadcast by the acceptable cell may be any PLMN ID rather than the registered/selected PLMN ID associated with the UE's selected/registered CAG ID for a UE in non-SNPN Access Mode with a selected/registered CAG ID, the CAG ID broadcast by the acceptable cell may be any CAG ID for a UE in non-SNPN Access Mode without a selected/registered CAG ID, the PLMN ID broadcast by the acceptable cell may be any PLMN ID rather than the registered/selected PLMN ID for a UE in non-SNPN Access Mode without a selected/registered CAG ID) and the PLMN (e.g., the PLMN operating the acceptable cell may be a default PLMN, the PLMN ID broadcast by the acceptable cell may be a default PLMN ID, the acceptable cell may not support the SNPN and PNI-NPN, the PLMN ID broadcast by the acceptable cell may be any PLMN ID rather than the PLMN ID associated with the UE's selected/registered CAG ID for a UE in non-SNPN Access Mode with a selected/registered CAG ID, the PLMN ID broadcast by the acceptable cell may be any PLMN ID rather than the PLMN ID associated with the UE's selected/registered PLMN ID for a UE in non-SNPN Access Mode without a selected/registered CAG ID); and

(14) acceptable cells supporting the SNPN (e.g., the selected SNPN when the UE was in SNPN Access Mode, the registered SNPN when the UE was in SNPN Access Mode, any SNPN, or a default SNPN), PNI-NPN (e.g., the PLMN ID associated with the CAG ID broadcast by the acceptable cell may be a default PLMN ID, the CAG ID broadcast by the acceptable cell may be any CAG ID rather than the UE's selected/registered CAG ID for a UE in non-SNPN Access Mode with a selected/registered CAG ID, the PLMN ID broadcast by the acceptable cell may be any PLMN ID rather than the registered/selected PLMN ID associated with the UE's selected/registered CAG ID for a UE in non-SNPN Access Mode with a selected/registered CAG ID, the CAG ID broadcast by the acceptable cell may be any CAG ID for a UE in non-SNPN Access Mode without a selected/registered CAG ID, the PLMN ID broadcast by the acceptable cell may be any PLMN ID rather than the registered/selected PLMN ID for a UE in non-SNPN Access Mode without a selected/registered CAG ID) and the PLMN (e.g., the PLMN operating the acceptable cell may be a default PLMN, the PLMN ID broadcast by the acceptable cell may be a default PLMN ID, the acceptable cell may not support SNPN and PNI-NPN, the PLMN ID broadcast by the acceptable cell may be any PLMN ID rather than the PLMN ID associated with the UE's selected/registered CAG ID for a UE in non-SNPN Access Mode with a selected/registered CAG ID, the PLMN ID broadcast by the acceptable cell may be any PLMN ID rather than the PLMN ID associated with the UE's selected/registered PLMN ID for a UE in non-SNPN Access Mode without a selected/registered CAG ID), on which to camp.

For a UE in non-SNPN Access Mode with a registered/selected CAG ID (e.g., a UE supporting PNI-NPN only, a UE supporting at least PNI-NPN), the UE may try all RATs for PNI-NPN deployments only rather than PLMN deployment. The UE may search for at least one high-quality cell.

The UE may determine the cell on which to camp by prioritizing these types of cells (e.g., one or more of types (8) to (14)). For a UE in non-SNPN Access Mode with a selected/registered CAG ID, the priority of a first group including at least one of types (9), (11), (13) and (14), may be higher than the priority of a second group including at least one of types (8), (10) and (12). For a UE in non-SNPN Access Mode without a selected/registered CAG ID, the priority of a third group including at least one of types (10), (12), (13) and (14), may be higher than the priority of a fourth group including at least one of types (8), (9) and (11). If the UE finds at least two cells with high-quality, the UE may camp on the cell belonging to the group with higher priority. If the UE finds at least two cells with high-quality and belonging to the group with the same priority, the UE may randomly camp on one of the cells. If the UE finds at least two cells with high-quality and belonging to the group with the same priority, the UE may camp on the cell with the highest quality.

The default SNPN may be a UE's (e.g., a UE in non-SNPN Access Mode) previously selected/registered SNPN. The UE (e.g., when the UE is in SNPN Access Mode) may store the selected/registered SNPN ID associated with the UE's selected/registered SNPN ID. When a UE in SNPN Access Mode changes to a UE in non-SNPN Access Mode, the UE may not clear/release the stored selected/registered SNPN ID associated with the selected/registered SNPN. The default SNPN may be a preconfigured SNPN (e.g., preconfigured by the core network, preconfigured by a USIM). The default SNPN may be associated with a default SNPN ID, which may be a dummy SNPN ID and/or a fixed SNPN ID. Such fixed SNPN ID may be globally unique, or may be locally unique (e.g., unique for a PLMN).

If the UE in non-SNPN Access Mode performs CAG cell (re)selection and/or if the UE operates in PNI-NPN scenarios, the UE may store a registered/selected CAG ID associated with the registered/selected CAG cell. The UE may transmit the registered/selected CAG ID to the network (e.g., a serving cell, a camped cell, a BS, network entity of a core network (e.g., AMF)) via RRC signaling and/or NAS signaling during RRC procedures (e.g., RRC signaling in the RRC setup request message during an RRC connection setup procedure, NAS signaling encapsulated in the RRC setup request message during RRC connection setup procedure, NAS signaling encapsulated in the RRC resume request message during RRC connection resumption procedure, and/or RRC signaling in the RRC resume request message during RRC connection resumption procedure). The UE may camp on a cell which broadcasts the UE's registered/selected CAG ID. The UE may consider a cell which broadcasts the UE's registered/selected CAG ID as a candidate cell during cell (re)selection.

After manual CAG selection by the UE's NAS layer, the UE's AS layer may select a cell that supports the manually selected CAG ID, in order to perform the registration procedure triggered by the UE's NAS layer. The selected CAG ID may include a manually-selected CAG ID and a not-manually selected CAG ID. The not-manually selected CAG ID may refer to a CAG ID that is not determined/derived from the manual CAG selection. The not-manually selected CAG ID may refer to a CAG ID that is determined/derived from the autonomous CAG selection. For example, during the cell reselection evaluation process, a manually-selected CAG ID may be treated with a higher priority than the not-manually selected CAG ID.

Determination of the SNPN/CAG/PLMN Cells

If the UE receives the broadcast PLMN ID and/or CAG ID from a cell (e.g., in the SIB1, in a cell access related information Information Element (IE), in an NPN identity information list IE), the UE may determine that such cell supports at least one PNI-NPN. The PLMN ID may be the default PLMN ID, associated with a default PLMN.

If the UE receives the broadcast SNPN ID (e.g., PLMN ID and/or Network ID) from a cell (e.g., in the SIB1, in a cell access related information IE, in an NPN identity information list IE), the UE may determine that such cell supports at least one SNPN. The SNPN ID may be the registered SNPN ID associated with a registered SNPN. The SNPN ID may be the selected SNPN ID associated with a selected SNPN.

If the UE receives the broadcast PLMN ID from a cell (e.g., in the SIB1, in a cell access related information IE, in a PLMN identity information list IE), the UE may determine that such cell supports at least one PLMN. The PLMN ID may be a default PLMN ID associated with a default PLMN.

Acceptable Cell in the NPN

An acceptable cell may be a cell (e.g., an SNPN only cell, a PLMN-only cell, a PNI-NPN only cell, a cell supporting SNPN and PLMN deployments, a cell supporting SNPN and PNI-NPN deployments, a cell supporting PNI-NPN and PLMN deployments, a cell supporting SNPN, PNI-NPN and PLMN deployments) on which a UE (e.g., a legacy UE without the support of the NPN, an advanced UE with the support of the NPN, or an advanced UE without the support of the NPN) may camp to obtain limited service (originate emergency calls and/or receive Earthquake and Tsunami Warning System (ETWS) and/or Commercial Mobile Alert Service (CMAS) notifications). An acceptable cell may fulfil the following set of requirements to initiate an emergency call and/or to receive ETWS and/or CMAS notification in an NR network:

the cell is not barred; and the cell fulfills the cell selection criteria.

For specific deployments (e.g., SNPN), an acceptable cell may be a specific cell (e.g., an SNPN-only cell) on which the UE (e.g., a legacy UE, an advanced UE without the support of the NPN, an advanced UE with the support of the NPN, a UE with a selected/registered SNPN ID, a UE with a selected/registered PLMN ID) in SNPN Access Mode may camp on to obtain limited services, to originate emergency calls only, to receive ETWS notification only, and/or to receive CMAS notification only. The limited services may include originating emergency calls and receiving ETWS/CMAS notification.

For specific deployments (e.g., SNPN), an acceptable cell may be a specific cell (e.g., an SNPN-only cell) on which a UE (e.g., a legacy UE, an advanced UE without the support of the NPN, an advanced UE with the support of the NPN but operating in normal PLMN mode, a UE with a selected/registered SNPN ID, a UE with a selected/registered PLMN ID) may camp on to receive ETWS/CMAS notification only but not to perform emergency services (e.g., originate emergency calls).

Camped on any Cell State in the SNPN

Once the UE (e.g., the UE in SNPN Access Mode) finds/camps on an acceptable cell, the UE (e.g., the UE in SNPN Access Mode) may transition to RRC_IDLE (if the UE was in RRC_INACTIVE) and enter the camped on any cell state (e.g., the camped on any cell state 116 in FIG. 1B). Once the UE (e.g., the UE in SNPN Access Mode) finds/camps on an acceptable cell, the UE (e.g., the UE in SNPN Access Mode) may stay in RRC_INACTIVE (if the UE was in RRC_INACTIVE) and enter the camped on any cell state. Once the UE (e.g., the UE in SNPN Access Mode) finds/camps on an acceptable cell, the UE (e.g., the UE in SNPN Access Mode) may stay in RRC_IDLE state (if the UE was in RRC_IDLE) and enter the camped on any cell state.

During the camped on any cell state (e.g., the camped on any cell state 116 in FIG. 1B), the UE may trigger and perform the cell reselection evaluation process (e.g., the cell reselection evaluation process 118 in FIG. 1B). If no acceptable cell is found during the cell reselection evaluation process, the UE may enter any cell selection state (e.g., the any cell selection state 114 in FIG. 1B). If an acceptable cell is found during the cell reselection evaluation process, the UE may enter the camped on any cell state (e.g., the camped on any cell state 116 in FIG. 1B). If a suitable cell is found, the UE may enter the camped normally state (e.g., the camped normally state 106 in FIG. 1A). If the UE in SNPN Access Mode is changed to non-SNPN Access Mode, the UE may transition to RRC_IDLE if the UE was in RRC_INACTIVE (or remain RRC_IDLE if the UE was in RRC_IDLE) and perform PLMN selection.

If the UE is assigned a selected PLMN during the change from SNPN Access Mode to non-SNPN Access Mode, the UE may not perform PLMN selection. The UE may directly perform cell (re)selection based on the selected PLMN. Thus, if the UE is assigned a selected PLMN during the mode change (from SNPN Access Mode to non-SNPN Access Mode) in the camped on any cell state, the UE may directly enter/remain RRC_IDLE and perform cell (re) selection (e.g., the initial cell selection 102 or the stored information cell selection 104 in FIG. 1A).

Selection of a Cell at Transition to RRC_IDLE or RRC_INACTIVE State

When returning to RRC_IDLE after the UE transitioned to RRC_CONNECTED from the camped on any cell state, the UE may attempt to camp on an acceptable cell according to the redirected carrier information (e.g., a RedirectedCarrierinfo IE), if included in the RRC Release message. If the UE cannot find an acceptable cell, the UE is allowed to camp on any acceptable cell of the indicated RAT. If the RRC Release message does not contain the redirected carrier information, the UE may attempt to select an acceptable cell on an NR frequency. If no acceptable cell is found according to the above, the UE may continue to search for an acceptable cell of any PLMN in the any cell selection state (e.g., the any cell selection state 114 in FIG. 1B).

For the UE in SNPN Access Mode, when returning to RRC_IDLE after the UE in SNPN Access Mode transitioned to RRC_CONNECTED from the camped on any cell state (e.g., the camped on any cell state 116 in FIG. 1B), the UE in SNPN Access Mode may attempt to camp on an acceptable cell according to the redirected carrier information (if the redirected carrier information is included in the RRC Release message which the UE in SNPN Access Mode receives from the network (e.g., serving cell)). The redirected carrier information may be NR carrier information or E-UTRA carrier information, which is disclosed based on a choice data structure defined in Abstract Syntax Notation One (ASN.1).

If the redirected carrier information includes NR carrier information, the UE in SNPN Access Mode may attempt to camp on an acceptable cell or a suitable cell which supports (only/at least) the SNPN in the NR carrier. The found/camped acceptable cell and/or suitable cell may be connected to a 5GC network.

If the redirected carrier information includes E-UTRA carrier information, the UE in SNPN Access Mode may attempt to camp on an acceptable cell and/or a suitable cell which supports (only/at least) the SNPN in the E-UTRA carrier. The found/camped acceptable cell and/or suitable cell may be connected to a 5GC network. If the cnType IE is absent, the UE may implicitly attempt to camp on an acceptable cell and/or a suitable cell which supports (only/at least) the SNPN and is connected to a 5GC network.

If no acceptable cell is found, the UE in SNPN Access Mode may continue to search for an acceptable cell of any SNPN in the any cell selection state. If no acceptable cell is found, the UE in SNPN Access Mode may continue to search for an acceptable cell of any PLMN in the any cell selection state, with/without an SNPN Access Mode change. It is noted that if no acceptable cell is found, SNPN Access Mode change may be triggered and the UE in SNPN Access Mode may transition to non-SNPN Access Mode. For a UE in non-SNPN Access Mode, if no acceptable cell is found, SNPN Access Mode change may be triggered and the UE in non-SNPN Access Mode may transition to SNPN Access Mode. An example data structure of the redirected carrier information (the RedirectedCarrierinfo IE) is illustrated in Table 1.

TABLE 1

```
RedirectedCarrierInfo ::=        CHOICE {
    nr                               CarrierInfoNR,
    eutra                            RedirectedCarrierInfo-EUTRA,
    ...
}
RedirectedCarrierInfo-EUTRA ::=  SEQUENCE {
    eutraFrequency                   ARFCN-ValueEUTRA,
    cnType                           ENUMERATED {epc,fiveGC}      OPTIONAL -- Need N
}
CarrierInfoNR ::=        SEQUENCE {
    carrierFreq                      ARFCN-ValueNR,
    ssbSubcarrierSpacing             SubcarrierSpacing,
    smtc                             SSB-MTC                     OPTIONAL  -- Need S
    ...
}
```

Cells with Cell Reservations, Access Restrictions or Unsuitable for Normal Camping If the highest ranked cell or best cell according to absolute priority reselection rules is an intra-frequency or inter-frequency cell which is not suitable due to being part of the "list of 5GS forbidden TAs for roaming" or belonging to a PLMN which is not indicated as equivalent to the registered PLMN or belonging to an SNPN which is not indicated as equivalent to the registered/selected SNPN or belonging to a CAG which is not indicated as equivalent to the (manually) selected CAG (ID), the UE (e.g., a UE in SNPN Access Mode or in non-SNPN Access Mode) may not consider this cell and other cells (e.g., the intra-frequency cells) on the same frequency as candidates for reselection for a maximum of 300 seconds. If the UE (e.g., the UE in SNPN Access Mode, the UE in non-SNPN Access Mode) enters the any cell selection state, any limitation (e.g., the limitation of prohibiting the (intra-frequency) cells from being selected as candidates for reselection for a maximum of 300 seconds) may be removed.

When the UE is operating on the unlicensed spectrum, if the highest ranked cell or best cell according to absolute priority reselection rules is an intra-frequency or inter-frequency cell which is not suitable due to being part of the "list of 5GS forbidden TAs for roaming" or belonging to a PLMN which is not indicated as equivalent to the registered PLMN or belonging to an SNPN which is not indicated as equivalent to the registered/selected SNPN or belonging to a CAG which is not indicated as equivalent to the (manually) selected CAG (ID), the UE (e.g., the UE in SNPN Access Mode, the UE in non-SNPN Access Mode) may not consider this cell as a candidate for reselection for a maximum of 300 seconds, but the UE (e.g., the UE in SNPN Access Mode, the UE in non-SNPN Access Mode) may still consider other cells (e.g., the intra-frequency cells) on the same frequency as candidates for reelection. If the UE (e.g., the UE in SNPN Access Mode, the UE in non-SNPN Access Mode) enters the any cell selection state, any limitation may be removed.

When the UE is operating on the licensed spectrum, if the highest ranked cell or best cell according to absolute priority reselection rules is an intra-frequency or inter-frequency cell which is not suitable due to being part of the "list of 5GS forbidden TAs for roaming" or belonging to a PLMN which is not indicated as equivalent to the registered PLMN or belonging to an SNPN which is not indicated as equivalent to the registered/selected SNPN or belonging to a CAG which is not indicated as equivalent to the (manually) selected CAG (ID), the UE (e.g., the UE in SNPN Access Mode or in non-SNPN Access Mode) may not consider this cell and other cells (e.g., the intra-frequency cells) on the same frequency as candidates for reselection for a maximum of 300 seconds. If the UE (e.g., the UE in SNPN Access Mode, the UE in non-SNPN Access Mode) enters the any cell selection state, any limitation may be removed.

When the UE is operating on the licensed spectrum, if the highest ranked cell or best cell according to absolute priority reselection rules is an intra-frequency or inter-frequency cell which is not suitable due to being part of the "list of 5GS forbidden TAs for roaming" or belonging to a PLMN which is not indicated as equivalent to the registered PLMN or belonging to an SNPN which is not indicated as equivalent to the registered/selected SNPN or belonging to a CAG which is not indicated as equivalent to the (manually) selected CAG (ID), the UE (e.g., the UE in SNPN Access Mode, the UE in non-SNPN Access Mode) may not consider this cell as a candidate for reselection for a maximum of 300 seconds, but the UE (e.g., the UE in SNPN Access Mode, the UE in non-SNPN Access Mode) may still consider other cells (e.g., the intra-frequency cells) on the same frequency as candidates for reselection. If the UE (e.g., the UE in SNPN Access Mode, the UE in non-SNPN Access Mode) enters the any cell selection state, any limitation may be removed.

Intra-Frequency-Reselection Indicator Handling

An intra-frequency-reselection indicator may be used to control cell selection/reselection to intra-frequency cells when the highest ranked cell is barred or treated as barred by the UE. The intra-frequency-reselection indicator may be set to a first value indicating that intra-frequency cell reselection is not allowed to be performed, or set to a second value indicating that intra-frequency cell reselection is allowed to be performed. The intra-frequency-reselection indicator may be an intraFreqReselection IE that is in the format of ENUMERATED {allowed, notAllowed}, where "ENUMERATED" is an ASN.1 type for listing a limited set of values. In such a case, the enumerated value of "notAllowed" may refer to the first value, and the enumerated value of "allowed" may refer to the second value.

UE in SNPN Access Mode

The UE in SNPN Access Mode may not ignore the intraFreqReselection IE broadcast by an SNPN cell in the system information (e.g., in an MIB, in SIB1, in an SNPN-specific system information block) in the licensed spectrum. The UE in SNPN Access Mode may consider the SNPN cell as the barred cell if the cellBarred in the acquired MIB is set to barred. In addition, if the intraFreqReselection IE is set to notAllowed, the UE in SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as not allowed. If the intraFreqReselection IE is not set to notAllowed (e.g., if the intraFreqReselection IE is set to Allowed), the UE in SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as allowed.

The UE in SNPN Access Mode may ignore the intraFreqReselection IE broadcast by an SNPN cell in the system information (e.g., in an MIB, in SIB1, in an SNPN-specific system information block) in unlicensed spectrum. The UE in SNPN Access Mode may consider the SNPN cell as the barred cell if the cellBarred in the acquired MIB is set to barred. In addition, if the intraFreqReselection IE is set to notAllowed or Allowed, the UE in SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as allowed. For example, the intraFreqReselection IE may be interpreted by the UE in SNPN Access Mode as allowed, if the SNPN cell is barred due to the registered/selected SNPN does not match one of the SNPN IDs in the system information (e.g., SIB 1, SNPN-specific system information block), and/or if SIB1 is not decoded by the UE in SNPN Access Mode. Alternatively, if the intraFreqReselection IE is set to notAllowed or Allowed, the UE in SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as notAllowed. For example, the intraFreqReselection IE may be interpreted by the UE in SNPN Access Mode as notAllowed, if the SNPN cell is barred due to the registered/selected SNPN not matching one of the SNPN IDs in the system information (e.g., SIB 1, SNPN-specific system information block), and/or if SIB1 is not decoded by the UE in SNPN Access Mode.

The UE in SNPN Access Mode may not ignore the intraFreqReselection IE broadcast by an SNPN cell in the system information (e.g., in an MIB, in SIB 1, in an SNPN-specific system information block) in the unlicensed spectrum. The UE in SNPN Access Mode may consider the SNPN cell as the barred cell if the cellBarred in the acquired MIB is set to barred. In addition, if the intraFreqReselection IE is set to notAllowed, the UE in SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as allowed. If the intraFreqReselection IE is not set to notAllowed (e.g., if the intraFreqReselection IE is set to Allowed), the UE in SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as allowed.

The UE in SNPN Access Mode may not ignore the intraFreqReselection IE broadcast by a non-SNPN cell in the system information (e.g., in an MIB, in SIB1, in an SNPN-specific system information block) in the licensed spectrum. The UE in SNPN Access Mode may consider the non-SNPN cell as the barred cell if the cellBarred in the acquired MIB is set to barred. In addition, if the intraFreqReselection IE is set to notAllowed, the UE in SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as not allowed. If the intraFreqReselection IE is not set to notAllowed (e.g., if the intraFreqReselection IE is set to Allowed), the UE in SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as allowed.

The UE in SNPN Access Mode may ignore the intraFreqReselection IE broadcast by a non-SNPN cell (e.g., CAG-only cell, PLMN cell, a cell supporting PNI-NPN and PLMN deployments) in the system information (e.g., in an MIB, in SIB1, in an SNPN-specific system information block) in the licensed spectrum (or in unlicensed spectrum). The UE in SNPN Access Mode may consider the non-SNPN cell as the barred cell if the cellBarred in the acquired MIB is set to barred. In addition, if the intraFreqReselection IE is set to notAllowed or Allowed, the UE in SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as allowed. For example, the intraFreqReselection IE may be interpreted by the UE in SNPN Access Mode as Allowed, if the SNPN cell is barred due to the condition when SIB1 is not decoded by the UE in SNPN Access Mode. Alternatively, if the intraFreqReselection IE is set to notAllowed or Allowed, the UE in SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as notAllowed. For example, the intraFreqReselection IE may be interpreted by the UE in SNPN Access Mode as notAllowed, if the SNPN cell is barred due to the condition that SIB1 is not decoded by the UE in SNPN Access Mode.

The UE in SNPN Access Mode may not ignore the intraFreqReselection IE broadcast by a non-SNPN cell (e.g., CAG-only cell, PLMN cell, a cell supporting PNI-NPN and PLMN deployments) in the system information (e.g., in an MIB, in SIB1, in an SNPN-specific system information block) in the licensed spectrum. The UE in SNPN Access Mode may consider the non-SNPN cell as the barred cell if the cellBarred in the acquired MIB is set to barred. In addition, if the intraFreqReselection IE is set to notAllowed, the UE in SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as not allowed. If the intraFreqReselection IE is set to Allowed, the UE in SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as allowed.

UE in Non-SNPN Access Mode

The UE not in SNPN Access Mode (i.e., the UE in non-SNPN Access Mode) may not ignore the intraFreqReselection IE broadcast by a CAG cell (e.g., a CAG-only cell, a cell supporting at least PNI-NPN deployments, a cell supporting at least SNPN and PNI-NPN deployments, a cell supporting SNPN and PNI-NPN and PLMN deployments) in the system information (e.g., in MIB, in SIB1, in PNI-NPN-specific system information block) in the licensed spectrum. The UE not in SNPN Access Mode may consider the CAG cell as the barred cell if the cellBarred in the acquired MIB is set to barred. In addition, if the intraFreqReselection IE is set to notAllowed, the UE not in an SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as not allowed. If the intraFreqReselection IE is not set to notAllowed (e.g., if the intraFreqReselection IE is set to Allowed), the UE not in SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as allowed.

The UE in non-SNPN Access Mode may ignore the intraFreqReselection IE broadcast by a CAG cell (e.g., a CAG-only cell, a cell supporting at least PNI-NPN deployments, a cell supporting at least SNPN and PNI-NPN deployments, a cell supporting SNPN and PNI-NPN and PLMN deployments) in the system information (e.g., in an MIB, in SIB 1, in a PNI-NPN-specific system information block) in the unlicensed spectrum. The UE in non-SNPN Access Mode may consider the CAG cell as the barred cell if the cellBarred in the acquired MIB is set to barred. In addition, if the intraFreqReselection IE is set to notAllowed or Allowed, the UE in non-SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as allowed. For example, the intraFreqReselection IE may be interpreted by the UE in non-SNPN Access Mode as allowed, if the cell is barred due to the registered/selected CAG (or all CAG IDs in the allowed CAG ID list) does not match one of the CAG IDs in the system information (e.g., SIB1 or a PNI-NPN-specific system information block), and/or if the SIB1 is not decoded by the UE in non-SNPN Access Mode. Alternatively, if the intraFreqReselection IE is set to notAllowed or Allowed, the UE in non-SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as notAllowed. For example, the intraFreqReselection IE may be interpreted by the UE in non-SNPN Access Mode as notAllowed, if the cell is barred due to the registered/selected CAG (or all CAG IDs in the allowed CAG ID list) does not match one of the CAG IDs in the system information (e.g., SIB1 or a PNI-NPN-specific system information block), and/or if the SIB1 is not decoded by the UE in non-SNPN Access Mode.

The UE in non-SNPN Access Mode may not ignore the intraFreqReselection IE broadcast by a non-CAG cell (e.g., an SNPN-only cell, a PLMN-only cell, a cell supporting at least SNPN deployments, a cell supporting at least SNPN and PLMN deployments) in the system information (e.g., in an MIB, in SIB1, in a PNI-NPN-specific system information block) in licensed spectrum. The UE in non-SNPN Access Mode may consider the non-CAG cell as the barred cell if the cellBarred in the acquired MIB is set to barred. In addition, if the intraFreqReselection IE is set to notAllowed, the UE in non-SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as not allowed. If the intraFreqReselection IE is not set to notAllowed (e.g., if the intraFreqReselection IE is set to Allowed), the UE in non-SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as allowed.

The UE in non-SNPN Access Mode may ignore the intraFreqReselection IE broadcast by a non-CAG cell (e.g., an SNPN-only cell, a PLMN-only cell, a cell supporting at least SNPN deployments, a cell supporting at least SNPN and PLMN deployments) in the system information (e.g., in an MIB, in SIB1, in a PNI-NPN-specific system information block) in the unlicensed spectrum. The UE in non-SNPN Access Mode may consider the non-CAG cell as the barred cell if the cellBarred in the acquired MIB is set to barred. In addition, if the intraFreqReselection IE is set to notAllowed or Allowed, the UE in non-SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as allowed. For example, the intraFreqReselection IE may be interpreted by the UE in non-SNPN Access Mode as allowed, if the cell is barred due to the condition when the SIB1 is not decoded by the UE in non-SNPN Access Mode. Alternatively, if the intraFreqReselection IE is set to notAllowed or Allowed, the UE in non-SNPN Access Mode may consider cell reselection to other cells (e.g., other SNPN-only cells, other CAG-only cells, other PLMN-only cells, other cells supporting at least SNPN deployments, other cells supporting at least PNI-NPN deployments, other cells supporting at least PLMN deployments, other cells supporting at least SNPN and PNI-NPN deployments, other cells supporting at least SNPN and PLMN deployments, and/or other cells supporting at least PNI-NPN and PLMN deployments) on the same frequency as notAllowed. For example, the intraFreqReselection IE may be interpreted by the UE in non-SNPN Access Mode as notAllowed, if the cell is barred due to the condition when the SIB1 is not decoded by the UE in non-SNPN Access Mode.

Figure 2:
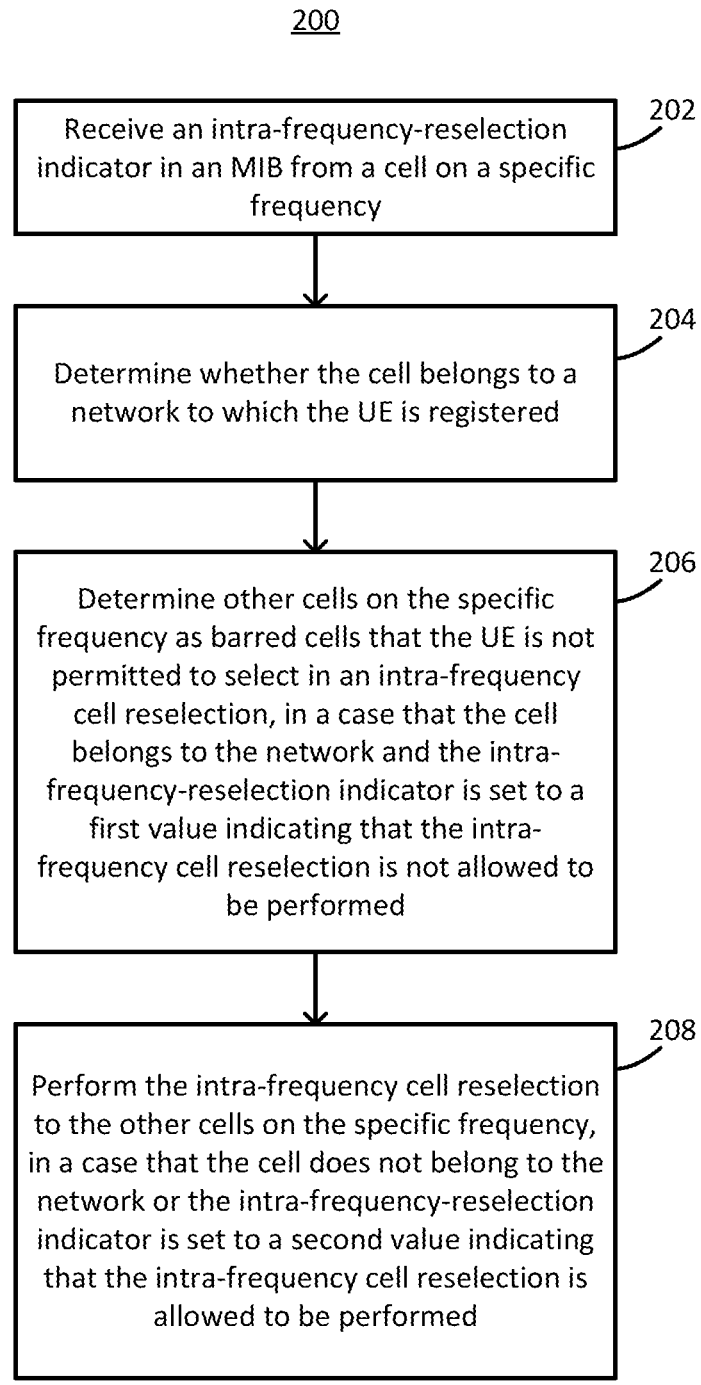
FIG. 2 illustrates a flowchart for a method performed by a UE for cell (re)selection, according to an implementation of the present disclosure.

FIG. 2 illustrates a flowchart for a method 200 performed by a UE for cell (re)selection, according to an implementation of the present disclosure. Although actions 202, 204, 206 and 208 are illustrated as separate actions represented as independent blocks in FIG. 2, these separately illustrated actions should not be construed as necessarily order dependent. The order in which the actions are performed in FIG. 2 is not intended to be construed as a limitation, and any number of the disclosed blocks may be combined in any order to implement the method, or an alternate method. Moreover, each of actions 202, 204, 206 and 208 may be performed independent of other actions, and can be omitted in some implementations of the present disclosure.

In action 202, the UE may receive an intra-frequency-reselection indicator in an MIB from a cell on a specific frequency. The intra-frequency-reselection indicator may be the intraFreqReselection IE described previously, or any other parameter/field that indicates whether intra-frequency cell reselection is allowed to be performed. For example, the intra-frequency-reselection indicator may be set to a first value indicating that intra-frequency cell reselection is not allowed to be performed, or set to a second value indicating that intra-frequency cell reselection is allowed to be performed. If the intra-frequency-reselection indicator (or the intraFreqReselection IE) is a one-bit indicator, the first value and the second value may be binary values (e.g., "0" and "1") of the one-bit indicator. The cell (on which the intra-frequency-reselection indicator is received) may belong to a plurality of networks. The cell may be operated by a plurality of networks, e.g., RAN sharing, network sharing. The plurality of networks may involve NPN deployments. For example, the plurality of networks (to which the cell belongs) may include a PLMN and an SNPN. The cell may broadcast the identities of the networks that operate the cell.

In action 204, the UE may determine whether the cell belongs to a network of the UE to which the UE is registered (which is referred to as a "registered network" of the UE in the present disclosure). The network (i.e., the registered network of the UE) may be one of a PLMN and an SNPN.

In action 206, the UE may determine other cells on the specific frequency as barred cells that the UE is not permitted to select in an intra-frequency cell reselection, in a case that the cell belongs to the network (i.e., the registered network of the UE) and the intra-frequency-reselection indicator is set to a first value (e.g., "notAllowed", if the intra-frequency-reselection indicator is the intraFreqReselection IE) indicating that the intra-frequency cell reselection is not allowed to be performed. The other cells disclosed in action 206 and the cell disclosed in action 202 may be considered as intra-frequency cells since these cells operate on the same frequency (specific frequency).

In action 208, the UE may perform the intra-frequency cell reselection to the other cells on the specific frequency, in a case that the cell does not belong to the network (i.e., the registered network of the UE) or the intra-frequency-reselection indicator is set to the second value (e.g., "Allowed", if the intra-frequency-reselection indicator is the intraFreqReselection IE) indicating that the intra-frequency cell reselection is allowed to be performed.

According to the method 200, the UE may follow the indication of the intra-frequency-reselection indicator (only) when the intra-frequency-reselection indicator is from (or associated with) the registered network of the UE. If the intra-frequency-reselection indicator is not from (or associated with) the registered network of the UE, the UE may ignore the intra-frequency-reselection indicator, no matter whether the intra-frequency-reselection indicator is set to the first value or the second value. For example, if the intra-frequency-reselection indicator is not from (associated with) the registered network of the UE, intra-frequency cell reselection may still be performed even if the intra-frequencyreselection indicator is set to the first value indicating that the intra-frequency cell reselection is not allowed to be performed.

Since the UE may follow or ignore the indication of an intra-frequency-reselection indicator according to whether the intra-frequency-reselection indicator comes from the registered network, unnecessary cell reselection restrictions/rules (e.g., restrictions from a non-registered network) can be avoided, thereby improving the efficiency of performing cell reselection. The efficiency of performing cell reselection may further save power of the network and the UE, especially the UE. Moreover, through the mechanism described previously, even if a cell belongs to multiple networks/operators at the same time, each network can correctly indicate to its registered UE(s) whether intra-frequency-reselection is allowed to be performed by transmitting the intra-frequency-reselection indicator, without transmitting additional signaling. Therefore, signaling overhead can be reduced. The reduction of signaling overhead may further save power of the network and the UE, especially the network.

Figure 3:
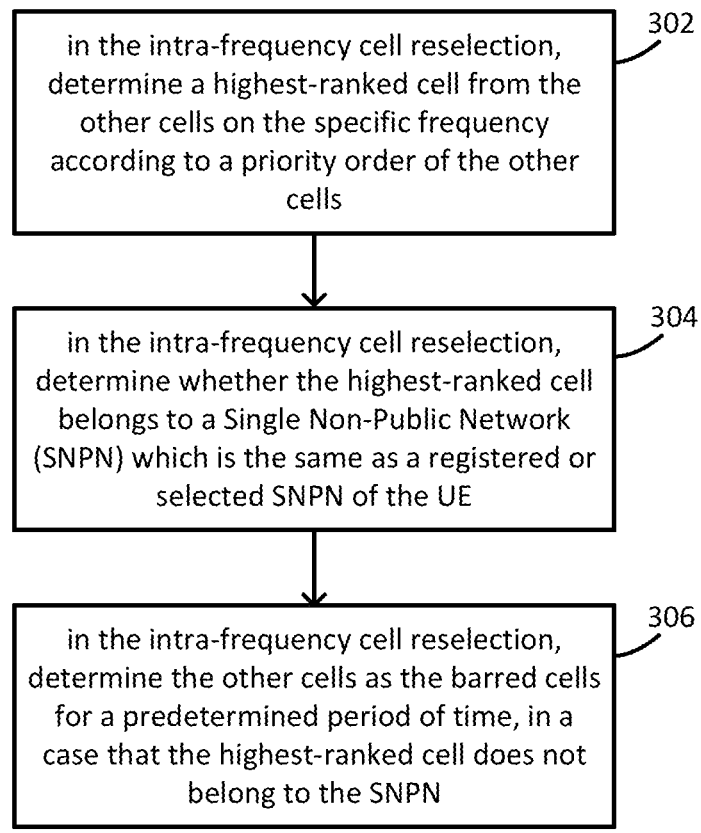
FIG. 3 illustrates a flowchart for a method of intra-frequency cell reselection according to an implementation of the present disclosure.

FIG. 3 illustrates a flowchart for a method 300 of intra-frequency cell reselection according to an implementation of the present disclosure. The intra-frequency cell reselection may correspond to action 208 of the method 200 illustrated in FIG. 2. The intra-frequency cell reselection may be performed when the UE is in SNPN Access Mode and operates in the licensed spectrum.

In action 302, in the intra-frequency cell reselection, the UE may determine a highest-ranked cell from the other cells on the specific frequency (e.g., the specific frequency described in action 202 in FIG. 2) according to a priority order of the other cells. In action 304, in the intra-frequency cell reselection, the UE may determine whether the highest-ranked cell belongs to an SNPN which is the same as a registered or selected SNPN of the UE (e.g., the UE is in SNPN Access Mode). In action 306, in the intra-frequency cell reselection, the UE may determine the other cells as the barred cells for a predetermined period of time, in a case that the highest-ranked cell does not belong to the SNPN. The predetermined period of time may be 300 seconds. Determining a highest-ranked cell and checking its property in the intra-frequency cell reselection can improve latency and save UE power during the cell reselection.

In the intra-frequency cell reselection, the UE may determine one (or more than one) of the other cells as a suitable cell(s) in a case that (1) the one (or more than one) of the other cells belongs to the SNPN, (2) a signal quality of the one (or more than one) of the other cells fulfills a cell selection criterion, (3) the one (or more than one) of the other cells is not barred from selection as the suitable cell(s), and (4) the one (or more than one) of the other cells does not belong a forbidden Tracking Area (TA) of the SNPN. Determining a suitable cell for SNPN can improve efficiency of the cell reselection and facilitate network access.

As described previously, if the UE enters the any cell selection state, any limitation (e.g., the limitation of prohibiting the (intra-frequency) cells from being selected as candidates for reselection for a maximum of 300 seconds) may be removed. A corresponding process is illustrated in FIG. 4.

Figure 4:
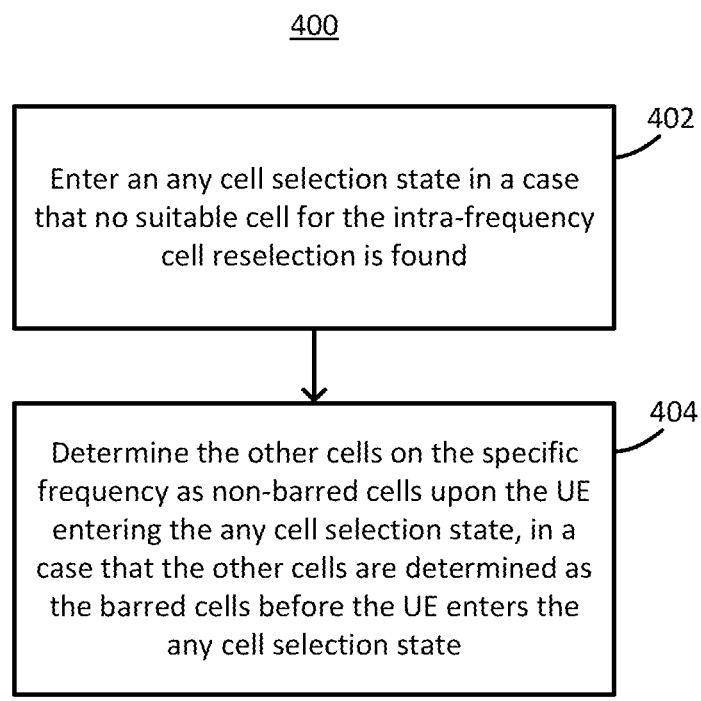
FIG. 4 illustrates a flowchart for a method of a UE that enters the any cell selection state according to an implementation of the present disclosure.

FIG. 4 illustrates a flowchart for a method 400 for a UE that enters the any cell selection state according to an implementation of the present disclosure. As illustrated in FIG. 4, in action 402, the UE may enter an any cell selection state (e.g., the any cell selection state in FIGS. 1A and 1B) in a case that no suitable cell for the intra-frequency cell reselection is found.

In action 404, the UE may determine the other cells on the specific frequency (e.g., the specific frequency described in action 202 in FIG. 2) as non-barred cells upon the UE entering the any cell selection state, in a case that the other cells are determined as the barred cells before the UE enters the any cell selection state. The non-barred cells may refer to the cells that the UE is permitted to select in the intra-frequency cell reselection.

Figure 5:
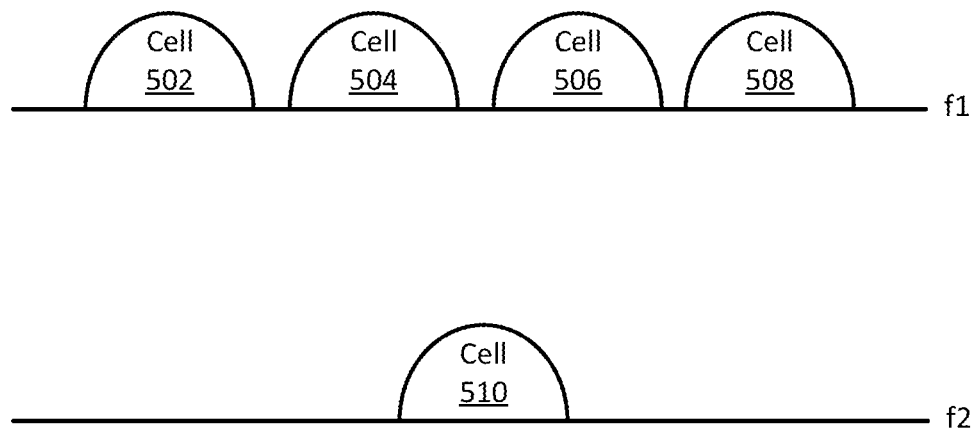
FIG. 5 is a schematic diagram illustrating cells on the same frequency and different frequencies.

FIG. 5 is a schematic diagram illustrating cells on the same frequency and different frequencies. As illustrated in FIG. 5, cells 502, 504, 506 and 508 are on the same frequency f1. In other words, the cells 502, 504, 506 and 508 are intra-frequency cells to each other. The cell 510 is on a different frequency f2 than the cells 502, 504, 506 and 508. Therefore, for each of the cells 502, 504, 506 and 508, the cell 510 is an inter-frequency cell.

Once intra-frequency cell (re)selection is performed on the frequency f1, the UE may try to select a suitable cell on which to camp from the intra-frequency cells 502, 504, 506 and 508 on the frequency f1. For example, if the UE receives the intra-frequency-reselection indicator from the cell 502, and the cell 502 does not belong to the registered network of the UE and/or the intra-frequency-reselection indicator is set to a second value (e.g., "Allowed", if the intra-frequency-reselection indicator is the intraFreqReselection IE) indicating that intra-frequency cell reselection is allowed to be performed, the UE may perform intra-frequency cell (re)selection to search for a suitable cell from other cells (e.g., cells 504, 506 and 508) on the same frequency f1 as the cell 502. The UE may determine a priority order of the cells 504, 506 and 508 on the frequency f1 (e.g., based on the respective signal qualities and/or other criteria described previously). If the priority order of the cells (from the highest to the lowest) is the cell 504 first, then the cell 506, and then the cell 508, the UE may first determine whether the highest-ranked cell (i.e., the cell 504) belongs to an SNPN which is the same as a registered or selected SNPN of the UE (if the UE is in SNPN Access Mode). If the cell 504 does not belong to the SNPN (which is the same as a registered or selected SNPN of the UE), the UE may directly consider all of the cells 504, 506 and 508 on the frequency f1 are barred cells for a predetermined period of time (e.g., 300 seconds). On the contrary, if one of the cells 504, 506 and 508 fulfills the following four conditions: (1) the cell belongs to the SNPN (which is the same as a registered or selected SNPN of the UE), (2) the signal quality of the cell fulfills a cell selection criterion, (3) the cell is not barred from selection as a suitable cell(s), and (4) the cell does not belong to a forbidden TA of the SNPN (which is the same as a registered or selected SNPN of the UE), the cell may be determined as a suitable cell on which to camp.

The following may be used to further disclose terms, examples, embodiments, implementations, actions, and/or behaviors:

The network, RAN, cell, camped cell, serving cell, BS, gNB, eNB and ng-eNB may be used interchangeably. Some of these items may refer to the same network entity.

The mechanisms described in the present disclosure may be applied to any RAT. The RAT may be (but not limited to) NR, NR-U, LTE, E-UTRA connected to 5GC, LTE connected to 5GC, E-UTRA connected to EPC, and LTE connected to EPC. The proposed mechanism may be applied for UEs in public networks, or in private networks (e.g., NPN, SNPN and PNI-NPN).

The UE behaviors described in the present disclosure may be used for the licensed frequency and/or the unlicensed frequency.

System information (SI) may refer to MIB, SIB1, and other SI. Minimum SI may include MIB and SIB1. Other SI may refer to SIB3, SIB4, SIB5, and other SIB(s) (e.g., SNPN-specific SIB, PNI-NPN-specific SIB).

Dedicated signaling may refer to (but not limited to) RRC message(s). For example, RRC (Connection) Setup Request message, RRC (Connection) Setup message, RRC (Connection) Setup Complete message, RRC (Connection) Reconfiguration message, RRC Connection Reconfiguration message including the mobility control information, RRC Connection Reconfiguration message without the mobility control information inside, RRC Reconfiguration message including the configuration with sync, RRC (Connection) Reconfiguration complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC Release message without the configuration with sync inside, RRC Release message including the suspend configuration, RRC Reconfiguration without the suspend configuration, RRC System Information Request message, UE Assistance Information message, UE Capability Enquiry message, and UE Capability Information message.

The RRC_CONNECTED UE, RRC_INACTIVE UE, and RRC_IDLE UE may apply the UE behaviors described in the present disclosure.

Generally, the disclosed mechanisms may be applied for the PCell and the UE. The mechanisms described in the present disclosure may be applied for the PSCell and the UE.

Allowed CAG list: a per-PLMN list of CAG Identifiers the UE is allowed to access.

CAG cell: A cell broadcasting at least one CAG Identifier.

Non-CAG cell: A cell not broadcasting any CAG Identifiers.

CAG ID: identifies a CAG within a PLMN.

NID: identifies an SNPN in combination with a PLMN ID.

NPN: A network deployed for non-public use.

Registered SNPN: This is the SNPN on which certain Location Registration outcomes have occurred.

Selected SNPN: This is the SNPN that has been selected by the NAS layer (e.g., the NAS layer of the UE, the NAS layer of the CN), either manually or automatically.

SNPN Access Mode: mode of operation wherein the UE only selects SNPNs.

SNPN ID: an identifier of an SNPN comprising a PLMN ID and an NID.

PNI-NPN ID: an identifier of an PNI-NPN comprising a PLMN ID and a CAG.

A UE in non-SNPN Access Mode may be equivalent to a UE not in SNPN Access Mode. A UE in non-SNPN Access Mode may be equivalent to a UE not operating in SNPN Access Mode. A UE in SNPN Access may be equivalent to a UE operating in SNPN Access Mode.

Figure 6:
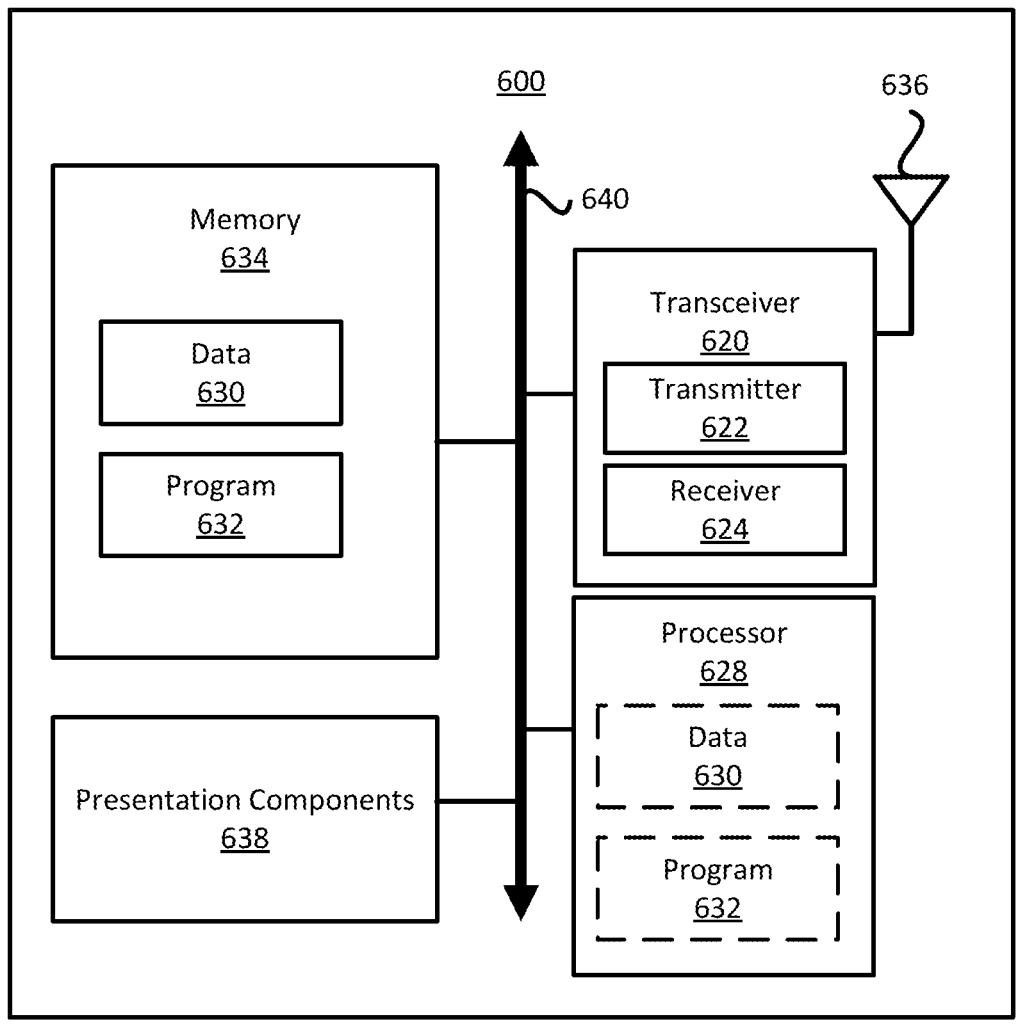
FIG. 6 is a block diagram illustrating a node for wireless communication according to an implementation of the present disclosure.

FIG. 6 is a block diagram illustrating a node 600 for wireless communication in accordance with various aspects of the present disclosure. As illustrated in FIG. 6, a node 600 may include a transceiver 620, a processor 628, a memory 634, one or more presentation components 638, and at least one antenna 636. The node 600 may also include a radio frequency (RF) spectrum band module, a BS communications module, a network communications module, and a system communications management module, Input/Output (I/O) ports, I/O components, and a power supply (not illustrated in FIG. 6).

Each of the components may directly or indirectly communicate with each other over one or more buses 640. The node 600 may be a UE or a BS that performs various functions disclosed with reference to FIGS. 1 through 5.

The transceiver 620 has a transmitter 622 (e.g., transmitting/transmission circuitry) and a receiver 624 (e.g., receiving/reception circuitry) and may be configured to transmit and/or receive time and/or frequency resource partitioning information. The transceiver 620 may be configured to transmit in different types of subframes and slots including but not limited to usable, non-usable and flexibly usable subframes and slot formats. The transceiver 620 may be configured to receive data and control channels.

The node 600 may include a variety of computer-readable media. Computer-readable media may be any available media that may be accessed by the node 600 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 634 may include computer-storage media in the form of volatile and/or non-volatile memory. The memory 634 may be removable, non-removable, or a combination thereof. Example memory may include solid-state memory, hard drives, optical-disc drives, etc. As illustrated in FIG. 6, the memory 634 may store a computer-readable and/or computer-executable program 632 (e.g., software codes) that are configured to, when executed, cause the processor 628 to perform various functions disclosed herein, for example, with reference to FIGS. 1 through 5. Alternatively, the program 632 may not be directly executable by the processor 628 but may be configured to cause the node 600 (e.g., when compiled and executed) to perform various functions disclosed herein.

The processor 628 (e.g., having processing circuitry) may include an intelligent hardware device, e.g., a Central Processing Unit (CPU), a microcontroller, an ASIC, etc. The processor 628 may include memory. The processor 628 may process the data 630 and the program 632 received from the memory 634, and information transmitted and received via the transceiver 620, the base band communications module, and/or the network communications module. The processor 628 may also process information to send to the transceiver 620 for transmission via the antenna 636 to the network communications module for transmission to a CN.

One or more presentation components 638 may present data indications to a person or another device. Examples of presentation components 638 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A method performed by a User Equipment (UE) for cell reselection, the method comprising:
   receiving an intra-frequency-reselection indicator in a Master Information Block (MIB) from a cell on a specific frequency;
   determining whether the cell belongs to a network to which the UE is registered;
   determining other cells on the specific frequency as barred cells that the UE is not permitted to select in an intra-frequency cell reselection in a case that the cell belongs to the network and the intra-frequency-reselection indicator is set to a first value indicating that the intra-frequency cell reselection is not allowed to be performed; and
   performing the intra-frequency cell reselection to the other cells on the specific frequency in a case that the cell does not belong to the network or the intra-frequency-reselection indicator is set to a second value indicating that the intra-frequency cell reselection is allowed to be performed,
   wherein performing the intra-frequency cell reselection comprises:
      determining a highest-ranked cell from the other cells on the specific frequency according to a priority order of the other cells;
      determining whether the highest-ranked cell belongs to a Single Non-Public Network (SNPN) which is the same as a registered or selected SNPN of the UE;
      determining the other cells as the barred cells for a predetermined period of time in a case that the highest-ranked cell does not belong to the SNPN; and
      determining one of the other cells as a suitable cell in a case that the one of the other cells belongs to the SNPN, a signal quality of the one of the other cells fulfills a cell selection criterion, the one of the other cells is not barred from selection as the suitable cell, and the one of the other cells does not belong to a forbidden Tracking Area (TA) of the SNPN.

2. The method according to claim 1, wherein the network is one of a Public Land Mobile Network (PLMN) or the SNPN.

3. The method according to claim 1, wherein the cell belongs to a plurality of networks including a Public Land Mobile Network (PLMN) the SNPN.

4. The method according to claim 1, wherein the intra-frequency cell reselection is performed when the UE is set to be in an SNPN access mode and operates in a licensed spectrum.

5. The method according to claim 1, further comprising:
   entering an any cell selection state in a case that no suitable cell for the intra-frequency cell reselection is found; and
   determining the other cells as non-barred cells upon the UE entering the any cell selection state in a case that the other cells are determined as the barred cells before the UE enters the any cell selection state.

6. The method according to claim 1, wherein the predetermined period of time is 300 seconds.

7. A User Equipment (UE) for cell reselection, the UE comprising:
   a transceiver configured to receive an intra-frequency-reselection indicator in a Master Information Block (MIB) from a cell on a specific frequency;
   a processor coupled to the transceiver; and
   a memory coupled to the processor, wherein the memory stores at least one computer-executable program that, when executed by the processor, causes the UE to:
   determine whether the cell belongs to a network to which the UE is registered;
   determine other cells on the specific frequency as barred cells that the UE is not permitted to select in an intra-frequency cell reselection in a case that the cell belongs to the network and the intra-frequency-reselection indicator is set to a first value indicating that the intra-frequency cell reselection is not allowed to be performed; and
   perform the intra-frequency cell reselection to the other cells on the specific frequency in a case that the cell does not belong to the network or the intra-frequency-reselection indicator is set to a second value indicating that the intra-frequency cell reselection is allowed to be performed,
   wherein performing the intra-frequency cell reselection comprises:
      determining a highest-ranked cell from the other cells on the specific frequency according to a priority order of the other cells;
      determining whether the highest-ranked cell belongs to a Single Non-Public Network (SNPN) which is the same as a registered or selected SNPN of the UE,
      determining the other cells as the barred cells for a predetermined period of time in a case that the highest-ranked cell does not belong to the SNPN, and
      determining one of the other cells as a suitable cell in a case that the one of the other cells belongs to the SNPN, a signal quality of the one of the other cells fulfills a cell selection criterion, the one of the other cells is not barred from selection as the suitable cell, and the one of the other cells does not belong to a forbidden Tracking Area (TA) of the SNPN.

8. The UE according to claim 7, wherein the network is one of a Public Land Mobile Network (PLMN) or the SNPN.

9. The UE according to claim 7, wherein the cell belongs to a plurality of networks including a Public Land Mobile Network (PLMN) and the SNPN.

10. The UE according to claim 7, wherein the intra-frequency cell reselection is performed when the UE is set to be in an SNPN access mode and operates in a licensed spectrum.

11. The UE according to claim 7, wherein when the at least one computer-executable program is executed by the processor, the computer-executable program further causes the UE to:
- enter an any cell selection state in a case that no suitable cell for the intra-frequency cell reselection is found; and
- determine the other cells as non-barred cells upon the UE entering the any cell selection state in a case that the other cells are determined as the barred cells before the UE enters the any cell selection state.

12. The UE according to claim 7, wherein the predetermined period of time is 300 seconds.

* * * * *